United States Patent
Wang et al.

(10) Patent No.: US 11,520,881 B2
(45) Date of Patent: *Dec. 6, 2022

(54) FRAMEWORK FOR CYBER-PHYSICAL SYSTEM PROTECTION OF ELECTRIC VEHICLE CHARGING STATIONS AND POWER GRID

(71) Applicant: General Electric Company, Schenectady, NY (US)

(72) Inventors: Honggang Wang, Clifton Park, NY (US); Willard Monten Wiseman, Amsterdam, NY (US); Masoud Abbaszadeh, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 16/255,073

(22) Filed: Jan. 23, 2019

(65) Prior Publication Data
US 2020/0233956 A1 Jul. 23, 2020

(51) Int. Cl.
*H04L 29/06* (2006.01)
*G06F 21/55* (2013.01)
(Continued)

(52) U.S. Cl.
CPC .......... *G06F 21/554* (2013.01); *B60L 53/66* (2019.02); *B60L 53/68* (2019.02); *H04L 9/0637* (2013.01);
(Continued)

(58) Field of Classification Search
CPC ........ G06F 21/554; G06F 21/57; G06F 21/64; B60L 53/68; B60L 53/66; B60L 3/0046;
(Continued)

(56) References Cited

U.S. PATENT DOCUMENTS

| 8,595,831 B2 | 11/2013 | Skare | |
|---|---|---|---|
| 2011/0099144 A1* | 4/2011 | Levy | B60L 53/30 709/227 |
| 2012/0331298 A1* | 12/2012 | Xu | H04W 12/069 713/171 |
| 2013/0127416 A1* | 5/2013 | Karner | B60L 53/31 320/109 |

(Continued)

FOREIGN PATENT DOCUMENTS

CN 104518533 * 4/2015

*Primary Examiner* — Taghi T Arani
*Assistant Examiner* — Lin Chang
(74) *Attorney, Agent, or Firm* — Buckley, Maschoff & Talwalkar LLC

(57) ABSTRACT

Some embodiments provide a system to protect an electric vehicle charging infrastructure. An electric vehicle charging site may receive AC power from a power grid and provide DC power to electric vehicles. The charging site may include a plurality of monitoring nodes each generating a series of current monitoring node values over time that represent a current operation of the electric vehicle charging infrastructure. A supply equipment communication controller may receive an access request from an access requestor associated with an electric vehicle, the access request being associated with a platform certificate. A secondary actor policy decision point at the charging site may evaluate the access requestor's identity and respond with an action message allowing high-level communication with the access requestor to proceed. Note that information associated with the current monitoring node values and/or the access request may be stored in a secure, distributed transaction ledger (e.g., an attestation blockchain).

31 Claims, 32 Drawing Sheets

(51) Int. Cl.
*B60L 53/68* (2019.01)
*B60L 53/66* (2019.01)
*H04L 9/06* (2006.01)
*H04L 9/32* (2006.01)
*H04L 9/00* (2022.01)

(52) U.S. Cl.
CPC .............. *H04L 9/3236* (2013.01); *H04L 9/50* (2022.05); *H04L 2209/84* (2013.01)

(58) Field of Classification Search
CPC ...... B60L 53/65; B60L 53/305; H04L 9/0637; H04L 9/3236; H04L 2209/84; H04L 2209/38; H04L 9/0897; H04L 9/3239; Y04S 40/20; Y02T 90/12; Y02T 10/7072; Y02T 10/70
See application file for complete search history.

(56) References Cited

U.S. PATENT DOCUMENTS

| | | | |
|---|---|---|---|
| 2013/0141040 A1* | 6/2013 | DeBoer | B60L 53/62 |
| | | | 320/109 |
| 2014/0289852 A1* | 9/2014 | Evans | G06F 21/55 |
| | | | 726/23 |
| 2015/0113275 A1* | 4/2015 | Kim | H04L 9/3278 |
| | | | 713/169 |
| 2017/0359366 A1* | 12/2017 | Bushey | H04L 63/1433 |
| 2018/0024900 A1 | 1/2018 | Premerlani et al. | |
| 2018/0336551 A1* | 11/2018 | Mouftah | G06Q 20/18 |
| 2018/0339601 A1* | 11/2018 | Kruszelnicki | B60L 53/16 |
| 2019/0056722 A1* | 2/2019 | Abbaszadeh | G06F 21/55 |
| 2019/0163178 A1* | 5/2019 | Sidle | G01S 13/862 |
| 2020/0162487 A1* | 5/2020 | Hong | B60L 53/31 |
| 2020/0200824 A1* | 6/2020 | Narayanaswami | |
| | | | H02J 13/00032 |

* cited by examiner

| CHARGING STATION IDENTIFIER 2502 | COMPONENT DESCRIPTION 2504 | GLOBAL CLASSIFIER 2506 | LOCAL CLASSIFIER 2508 | FAULT CLASSIFIER 2510 | STATUS 2512 |
|---|---|---|---|---|---|
| CS_101 | BATTERY | NONE | 3-CLASS | MULTI-CLASS | TRAINED |
| CS_101 | INVERTER | NONE | MULTI-CLASS | NONE | TRAINED |
| CS_101 | TRANSFORMER | BINARY | BINARY | MULTI-CLASS | PENDING |
| CS_102 | BATTERY | MULTI-CLASS | MULTI-CLASS | NONE | TRAINED |

*FIG. 25*

| # | N | A | F |
|---|---|---|---|
| N | 594 | 27 | 0 |
| A | 15 | 896 | 1 |
| F | 0 | 0 | 24 |

ACTUAL CLASS — PREDICTED CLASS — 2610

| % | N | A | F |
|---|---|---|---|
| N | 95.7 | 4.4 | 0 |
| A | 1.64 | 98.3 | 0.1 |
| F | 0 | 0 | 100 |

ACTUAL CLASS — PREDICTED CLASS — 2620

*FIG. 26*

FRAMEWORK FOR CYBER-PHYSICAL SYSTEM PROTECTION OF ELECTRIC VEHICLE CHARGING STATIONS AND POWER GRID

BACKGROUND

Electric vehicle charging infrastructures that operate physical systems (e.g., associated with electric vehicles and charging stations) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage. Currently, little work is being done to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an electric vehicle charging infrastructure, such as failure and diagnostics technologies, may not adequately address these problems—especially when multiple, simultaneous attacks and/faults occur since such multiple faults/failure diagnostic technologies are not designed for detecting stealthy attacks in an automatic manner.

An increase in electric vehicle charging power levels (e.g., up to 350 Kilowatts ("KW") as in Extreme Fast Charging ("XFC")) may poses additional cybersecurity risks for the power grid and the evolving electrified transportation system. Moreover, these risks may be compounded by the accelerated rate of data sharing within the elective vehicle infrastructure and the mobile nature of electric vehicles.

For example, within the IT-layer, malware loaded onto an electric vehicle or Electric Vehicle Supplier Equipment ("EVSE") might propagate to other equipment in the smart grid, leading to severe regional blackouts. In the OT layer, hacked communications between the electric vehicle and the EVSE might overcharge batteries and could cause severe damage to electric vehicles. An intentional physical layer attack, such as rapid cycling of multiple high-power electric vehicle charging station loads, may cause widespread disruption in the power grid. Any single IT, OT, or physical layer protection technique cannot by itself effectively ensure the resiliency of the electric vehicle charging infrastructure in the face of a determined cyberattack. There is a growing need for a holistic end-to-end solution with a "defense-in-depth" architecture consisting of IT, OT and physical-layer protections.

Note that much of a component's security properties can depend on the details of its hardware implementation. Authenticity of the hardware may be critical when deciding whether or not to trust a component. As both an electric vehicle and an EVSE may be associated with a diverse set of manufacturers (and may be privately owned), there is a possibility that counterfeit components may be encountered. Determining that a particular component is authentic (i.e., not counterfeit) may be critical when deciding whether or not it should be trusted. Relying on software to provide the hardware's identity may be insufficient because software has a proven record of being vulnerable to attacks that lead to identity forging. It would therefore be desirable to protect an electric vehicle charging infrastructure from cyber-attacks in an automatic and accurate manner even when attacks percolate through the IT and OT layers and directly harm control systems.

SUMMARY

Some embodiments described herein provide a general framework to protect a charging station and the power grid from a cyber-attack. The system may include attestation and blockchain based cyber hardening, anomaly localization and accommodation, intrusion detection, and/or decision fusion. In the IT and OT layers, cyber hardening and/or hardware roots of trust may provide platform certificates to support bidirectional authentication of an electric vehicle and electric vehicle supply equipment (as well as reference integrity specifications for dynamic integrity verification). In the physical layer, anomaly detection and localization may be conducted in a "one shot" fashion to deal with the fast dynamics in power electronics and power systems. A decision fusion element may aggregate the detection and accommodation knowledge from the IT, OT, and physical layers and make an integrated decision that has a higher accuracy as compared to any single module.

According to some embodiments, a system may be provided to protect an electric vehicle charging infrastructure. An electric vehicle charging site may receive AC power from a power grid and provide DC power to electric vehicles. The charging site may include a plurality of monitoring nodes each generating a series of current monitoring node values over time that represent a current operation of the electric vehicle charging infrastructure. A supply equipment communication controller may receive an access request from an access requestor associated with an electric vehicle, the access request being associated with a platform certificate (and, in some embodiments, a software identifier). A secondary actor policy decision point at the charging site may evaluate the access requestor's identity and respond with an action message allowing high-level communication with the access requestor to proceed. Note that information associated with the current monitoring node values and/or the access request may be stored in a secure, distributed transaction ledger (e.g., an attestation blockchain).

Some embodiments comprise: means for receiving, from a normal space data source for each of a plurality of monitoring nodes, a series of normal monitoring node values over time that represent normal operation of an electric vehicle charging infrastructure; means for receiving, from an attacked space data source for each of the plurality of monitoring nodes, a series of attacked monitoring node values over time that represent attacked operation of the electric vehicle charging infrastructure; means for receiving, from a fault space data source for each of the plurality of monitoring nodes, a series of fault monitoring node values over time that represent fault operation of the electric vehicle charging infrastructure; and means for automatically calculating and outputting, by a multi-class classifier model creation computer, at least one decision boundary for a multi-class classifier model based on the set of normal feature vectors, the set of attacked feature vectors, and the set of fault feature vectors.

Other embodiments comprise: means for receiving, from a plurality of monitoring nodes, a series of current monitoring node values over time that represent a current operation of an electric vehicle charging infrastructure; means for generating, by a node classifier computer, a set of current feature vectors; means for accessing at least one multi-class classifier model having at least one decision boundary; and means for executing at least one multi-class classifier model and transmitting a classification result based on the set of current feature vectors and at least one decision boundary, wherein the classification result indicates whether a monitoring node status is normal, attacked, or fault.

Some technical advantages of some embodiments disclosed herein are improved systems and methods to protect an electric vehicle charging infrastructure from cyber-attacks (and, in some cases, faults) in an automatic and accurate manner.

BRIEF DESCRIPTION OF THE DRAWINGS

FIG. 25 is a tabular portion of a configuration database.

FIG. 26 are classification results according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
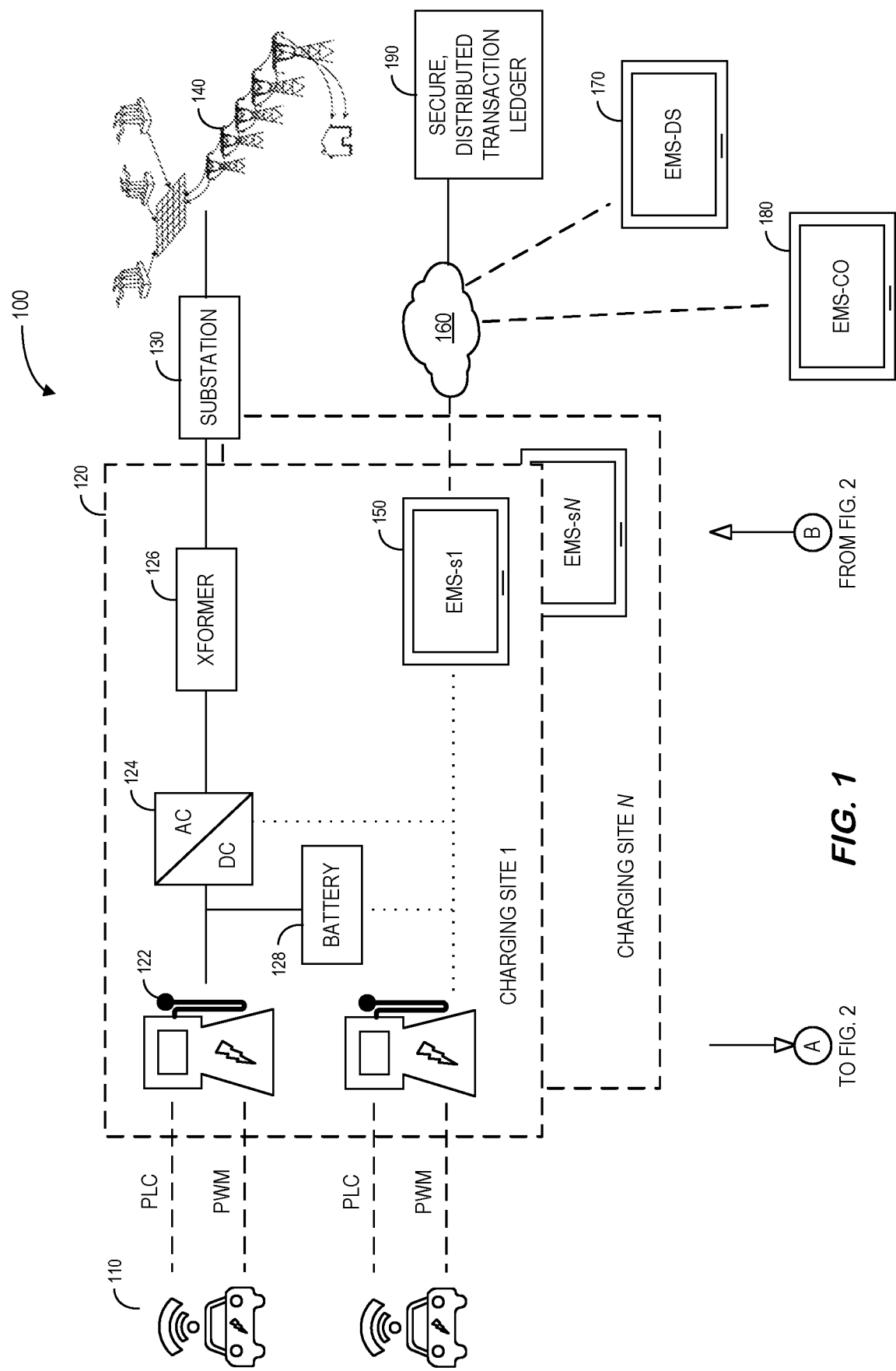
FIG. 1 is high-level architecture of an electric vehicle charging infrastructure cyber-physical system according to some embodiments.

FIG. 1 is high-level architecture 100 of an Electric Vehicle ("EV") 110 charging infrastructure cyber-physical system that might include charge pumps 122 according to some embodiments. The EV 110 and charge pumps 122 might exchange, for example, Power Line Communication ("PLC") and/or Pulse Width Modulation ("PWM") information. Note that EVs 110 are expected to become a major component of the power grid 140, and FIG. 1 illustrates a power topology of an XFC charging station site 120. Since multiple 350 kW access points may be co-located at a single charging station site 120, large variations in average and peak charging demands may exist throughout the day. For this reason, it may prove desirable to integrate local energy sources such as batteries 128 and solar generation within the charging site 120. XFCs and energy sources may typically be integrated via low voltage AC distribution. However, as the total capacity of the XFC charging site 120 increases with respect to the AC grid supply, DC distribution may become a much more economic and compact solution. As shown in FIG. 1, an XFC charging site 120 might be coupled through a DC bus.

An energy storage device, such as the battery 128, may connect to the DC bus to reduce the grid stress, accommodate distributed power generation, and/or reduce cost through demand response. An AC/DC grid-interface inverter 124 may transfer power between the shared DC bus and the AC grid feeder. Together with a transformer 126 and switchgear, the inverter 124 and shared DC bus forms one charging site 120. Using one or multiple points-of-interconnect, charging sites 120 may interface with the power grid 140 at a location downstream from a distribution substation 130 operated and controlled by a Distribution Substation Energy Management System ("EMS-DS") 170 via a communication network 160. The EMS-DS 170 may communicate with a Charging Network Operator Controller ("EMS-CO") 180. The EMS-CO 180 may manage each XFC directly or through an on-site EMS 150 (e.g., "EMS-s1" through EMS-sN). As will be described, the architecture 100 may include a secure, distributed transaction ledger 190 (e.g., an attestation blockchain).

Figure 2:
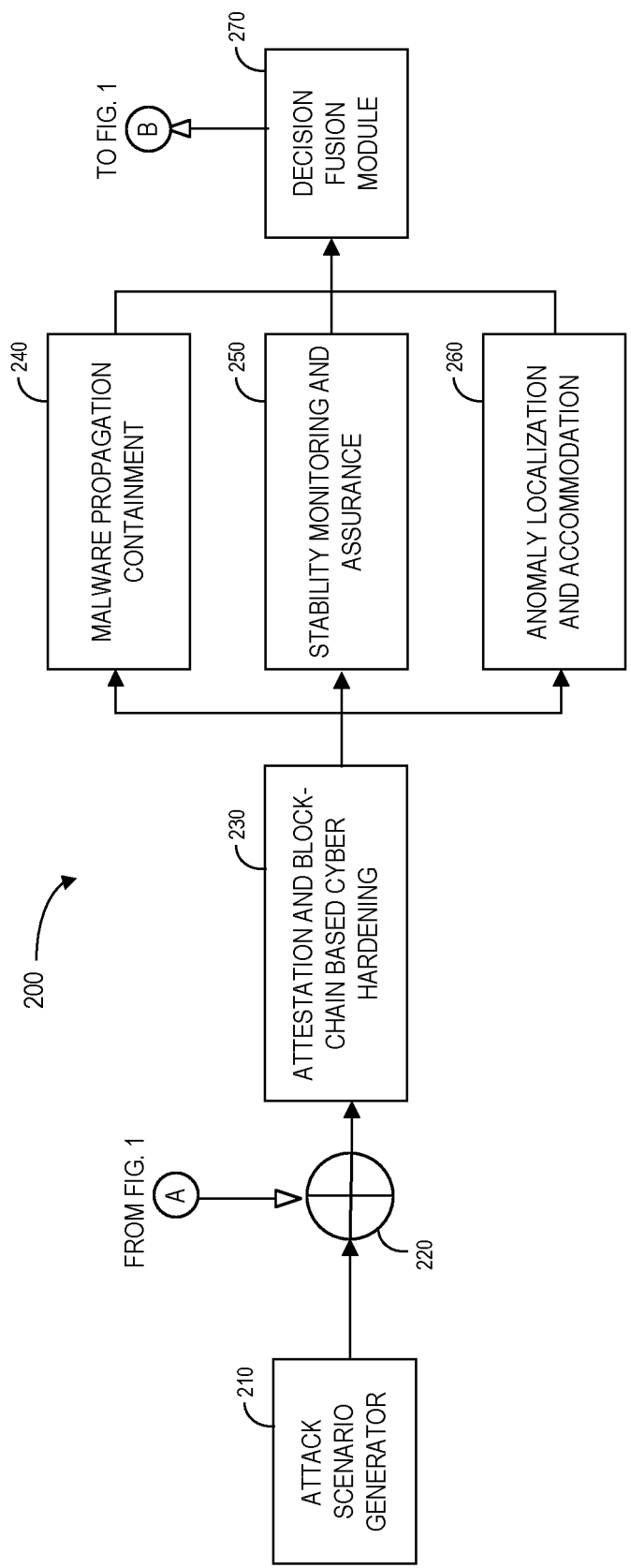
FIG. 2 illustrates a charging infrastructure protection system in accordance with some embodiments.

FIG. 2 illustrates a charging infrastructure protection system 200 in accordance with some embodiments. The system 200 may receive information from the architecture 100 of FIG. 1. For example, the system 200 might receive information about voltage, current, a charging rate limit, a duty ratio, a transformer temperature, a load, a visit date, a driver preference, a radio frequency identifier tag, a demand response command, weather data, pricing data, a firewall log file, etc. The received information may be combined 220 with information from an attack scenario generator 210 and provided to an attestation and block-chain based cyber hardening element 230 for IT and OT protection (e.g., associated with the secure, distributed transaction ledger 190 of FIG. 1). Next, malware propagation containment 240 (associated with IT protection), stability monitoring and assurance 250 (associated with physical protection), and anomaly localization and accommodation 260 (associated with physical protection) may be performed and the results may be processed by a decision fusion module 270. The decision fusion model 270 may then transmit information (e.g., a command) to the architecture 100 of FIG. 1. For example, the decision fusion model 270 might provide an indication to disable/enable various station breakers, data about local battery storage regulation, notifications about single (or coordinated) cyber-attacks and localization information, etc.

According to some embodiments, a decision fusion model selects one final decision or hypothesis from the set of decision or hypothesis generated by individual decision of cyber hardening element 230, malware propagation containment 240, stability monitoring and/or assurance 250 and anomaly localization and accommodation 260. Such an approach may save communication bandwidth and improve decision accuracy, which in turn may improve a cyber protection system's speed and false alarm rate.

Decisions can derive from homogeneous or heterogeneous monitoring nodes. Common decision-level sensor fusion methods include Bayesian inference, fuzzy logic, heuristic-based (voting), and classical inference. Below are some typical steps for the most commonly used Bayes fusion method. First, take the data layer fusion results as the prior information, and check the credibility of the prior information if necessary. Second, determine the unknown parameters' prior distributions according to the prior information using proper methods. Third, transform the different development stage data fusion results into the likelihood functions. Finally, fuse the different system hierarchy data fusion results and the different development stage data fusion results to get the posterior distribution with Bayes equation.

Thus, relevant system operating data may be collected and processed in substantially real-time manner to classify normal system behavior, physical faults, and/or cyberattacks and to provide online mitigation in the event of a cyberattack. Charging site communications may initially be cyber-hardened in the OT layer using attestation and blockchain methods to provide a front-line of defense against firmware or software cyberattacks. According to some embodiments, blockchain-anchored attestation servers provide compromise detection. The hardware roots of trust may provide platform certificates, which support bidirectional authentication of the EV and the EVSE (as well as reference integrity specifications for dynamic integrity verification). With continuous, centralized verification of component integrity, malicious attempts to compromise system firmware and software may be immediately and reliably detected.

The cyber-hardened communications data may then be examined by the malware propagation containment 240, the electrical system stability monitoring and assurance 250, and the anomaly location and accommodation 260 modules. The three modules 240, 250, 260 may work in parallel to execute sophisticated cyberattack detection and accommodation algorithms and decide upon remedial actions based on deep domain expertise. The outputs of the three parallel modules 240, 250, 260 may be then aggregated in the decision fusion module 270, which tends to provide more accurate and reliable information as compared to any of the three individual decision-making modules 240, 250, 260 alone. The output of the decision fusion module 270 might comprise, for example, actionable information in the form of notifications in a user interface of a charging network and/or grid operator and might include control commands issued directly to each EMS and EVSE Communication Controller ("EVCC").

Figure 3A:
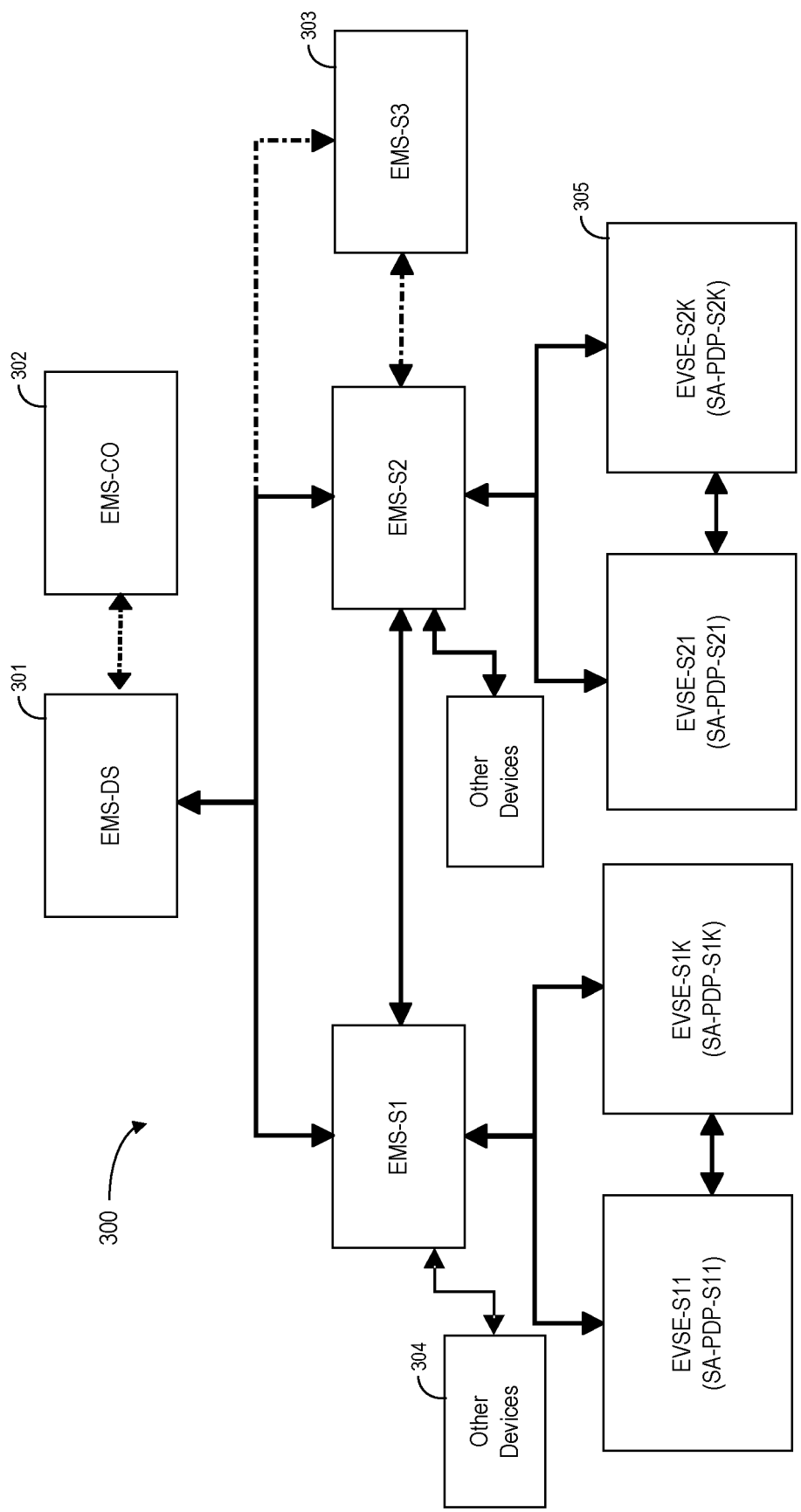
FIG. 3A is an overall system architecture illustrating relationships between charging station components in accordance with some embodiments.

FIG. 3A is an overall system architecture 300 illustrating relationships between charging station components in accordance with some embodiments. The architecture 300 includes EVSE, Charging Station Energy Management System ("EMS-Si") 303, Distribution Substation Energy Management System ("EMS-DS") 301 and Charging Operational Energy Management System ("EMS-CO") 302. Normally, there is one EMS-Si 303 in one charging station. As shown in FIG. 3A, multiple EVSE 305, together with other power equipment 304 instrumentation inside the one charging station may also communicate with the EMS-Si 303. Multiple EMS-Si 303, each managing one charging station, are in communication with the EMS-DS 301 and/or EMS-CO 302.

According to some embodiments, attestation based cyber hardening is provided within the EVSE or at the bottom level of the overall system architecture 300. As shown in FIG. 2, the overall framework links the cyber hardening (as described with respect to FIG. 7), malware propagation containment, stability assurance and anomaly localization and accommodation (described with respect to FIG. 9) via data fusion module (as described with respect to FIGS. 4 through 6). Depending on where the data fusion resides, the corresponding communication mechanism and the impact on the scope of decision making may be different.

Figure 3B:
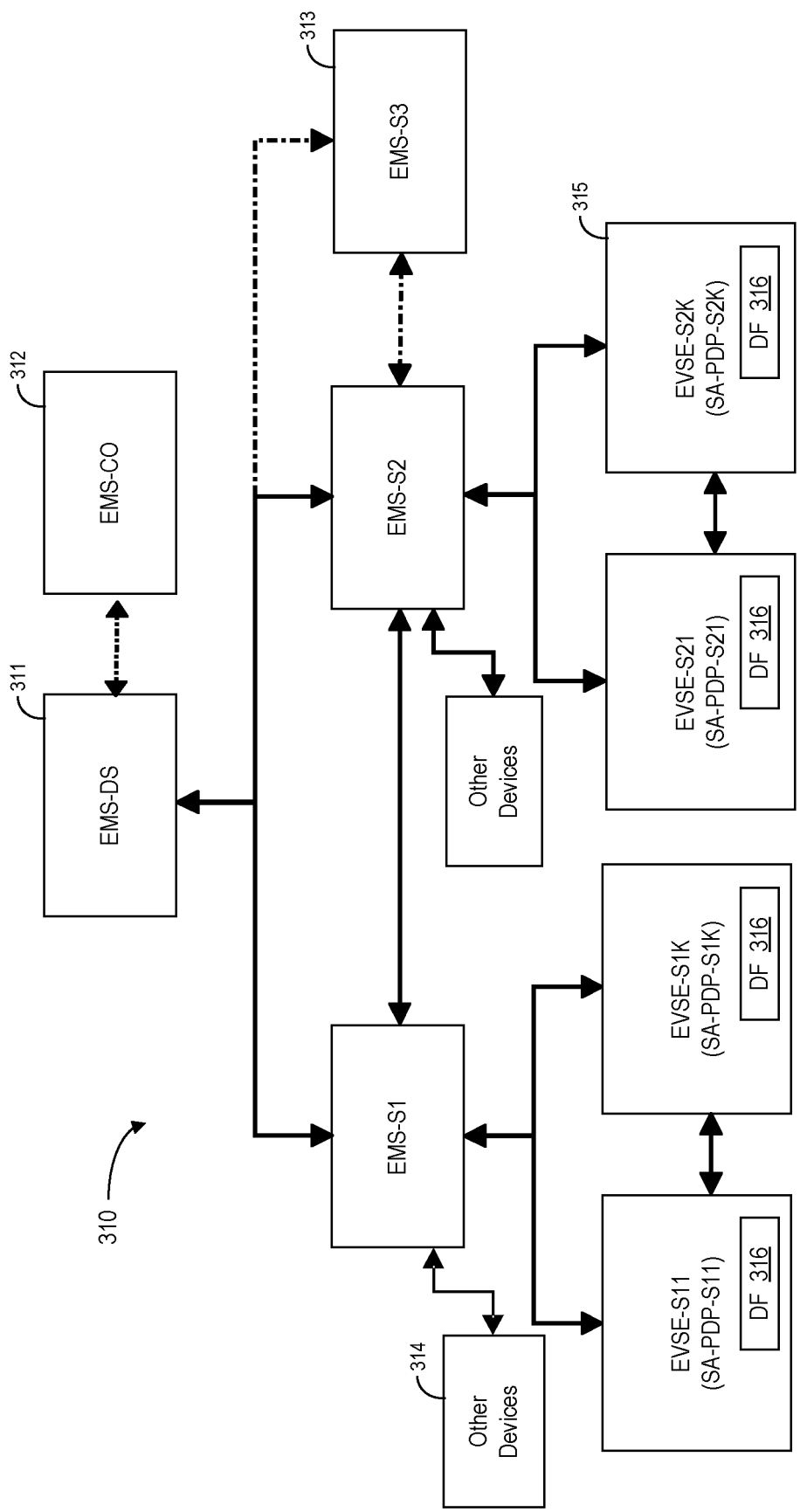
FIGS. 3B through 3E illustrate various embodiments incorporating data fusion into such an architecture.

FIGS. 3B through 3E illustrate various embodiments incorporating data fusion into the architecture 300. In particular, FIG. 3B shows an embodiment 310 where a Data Fusion ("DF") module 316 resides in inside one or more EVSE 315. The output from attack localization and accommodation may be transmitted to one or more secondary actor policy decision points, and the detection feature or decision from the output of attack localization and accommodation, together with information from malware propagation containment and stability assurance and the output of platform identity evaluation in a secondary actor policy decision point, may be fused to a final decision. This may include allowing or refusing electrical or communication connection to an EV (to protect itself from adversary in EV) and/or electrically or communicationally connecting or disconnecting the EVSE from the charging station (to protect itself from the charging station or others inside the charging station). The final command might be transmitted from the EVSE 315.

This approach lets each EVSE make its own decision, which is an example of distributed intelligence. It can maintain a relative high degree of availability and system reliability during loss of any equipment within a charging station. The processing for an EV-EVSE communication check may be the fastest at this layer. However, the other information, such as global information from the charging station level or substation level, may need to go through a communication delay. This may require a substantial volume of information flowing into the EVSE and/or a high processing load within the EVSE (which has a higher requirement on the hardware and software inside of EVSE).

Figure 3C:
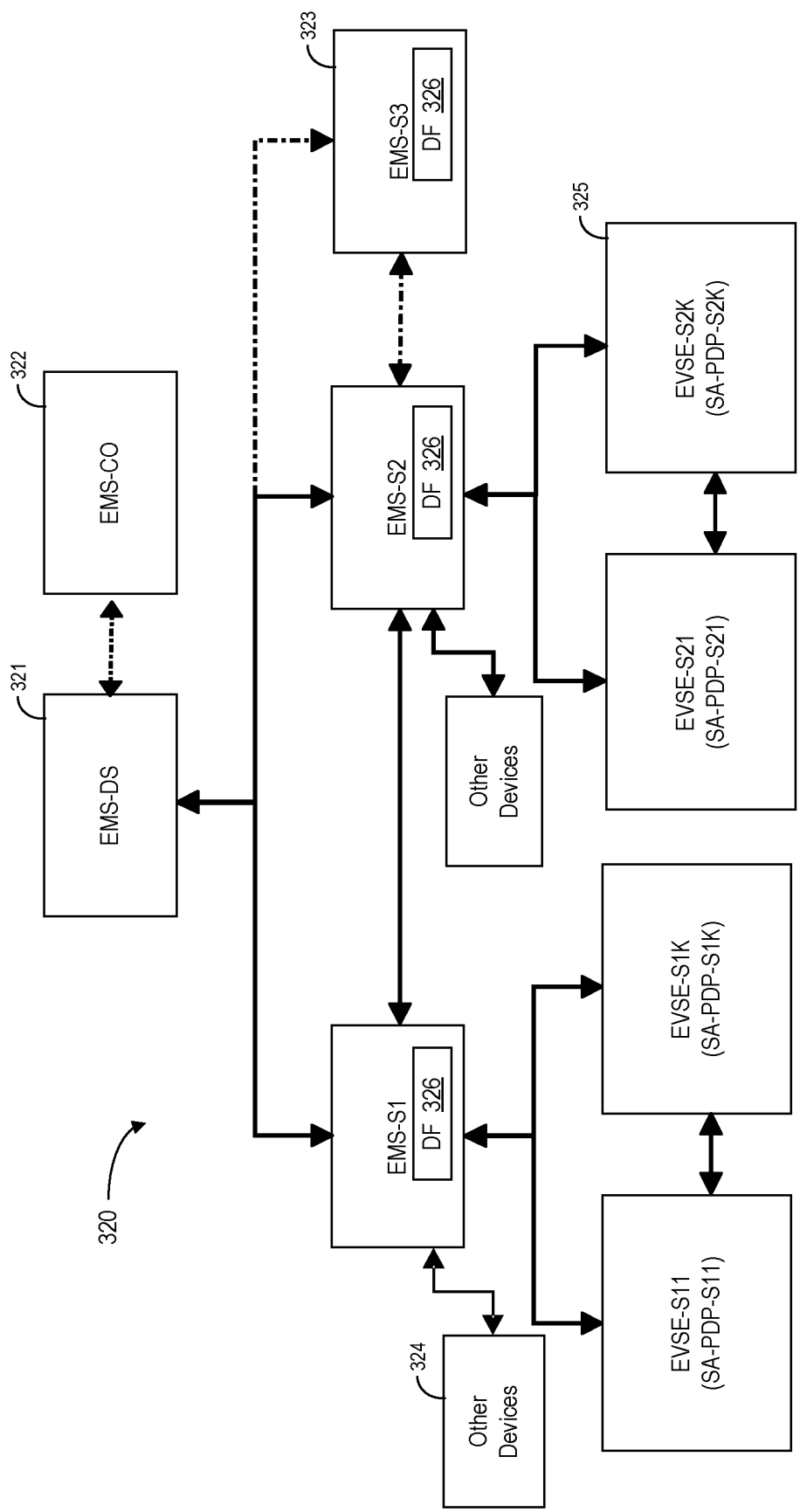

FIG. 3C shows an embodiment 320 where the DF module 326 is located at the secondary layer (which is inside one or more EMS-Si 323). The output of one or multiple secondary actor policy decision point may be transmitted to the EMS- Si 323, wherein the detection feature or decision from malware propagation containment module, stability monitoring and assurance module, the output of attack localization and accommodation, and the output of platform identity evaluation in secondary actor policy decision point may be fused to a final decision, including electrically or communicationally connecting or disconnecting one or more EVSEs, energy storage devices to or from the charging station; or electrically or communicationally connecting or disconnecting this charging station to or from a substation. The final command may be transmitted from the EMS-Si 323.

This approach makes a decision at the middle layer the architecture. The decision can be made based on the overview of all monitoring nodes inside the charging station, which tends to have a lower false alarm rate. However, it may lead to a slow decision making for EV-EVSE cyber check. One way to get around this drawback is to let each EVSE make its own decision at a faster looping rate without asking the EMS-Si 323.

Figure 3D:
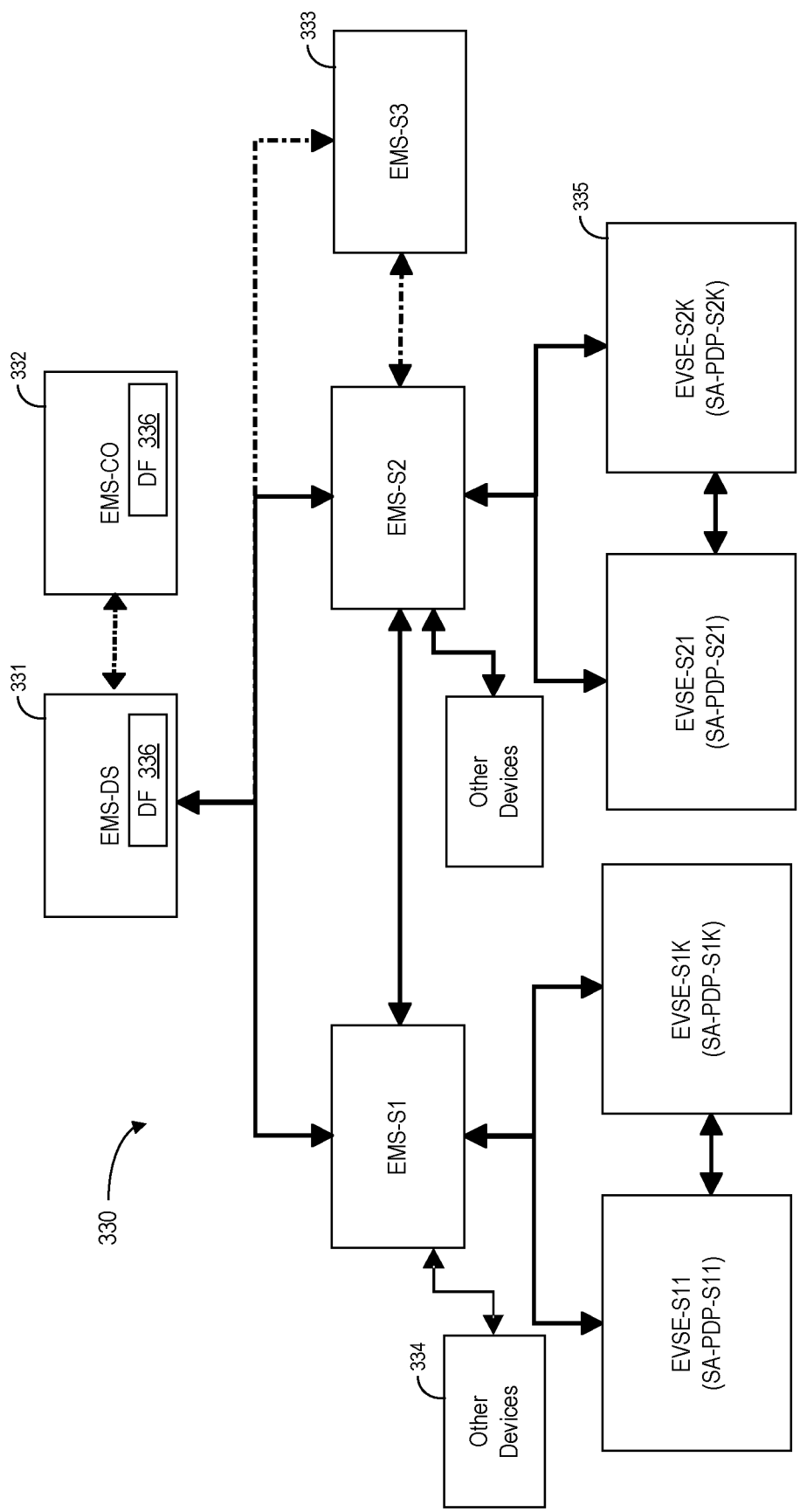

FIG. 3D shows an embodiment 330 where a DF module 336 is located within the first layer, which is inside one or more EMS-DS 331 and/or EMS-CO 332. The EMS-DS 331 and the EMS-CO 332 may be interchangeable in this context (even though their roles have many other differences). The output of one or more secondary actor policy decision points may be transmitted, via either EMS-Si 333 or a direct link, to EMS-DS 331, wherein the detection feature or decision from malware propagation containment module, stability monitoring and assurance module, the output of attack localization and accommodation and the output of platform identity evaluation in secondary actor policy decision point may be fused to a final decision, including electrically or communicationally connecting or disconnecting one or more EVSEs, energy storage devices to or from the charging station; or electrically or communicationally connecting or disconnecting this charging station to or from a substation. The final command may be transmitted from the EMS-DS 331 or EMS-CO 332.

The final decision making is based on all the information from different charging stations and their devices. Those attacks, such as a covert attack or coordinated attacks on multiple stations, may be detected in this configuration. This may not be possible if decision fusion is at charging station layer or EVSE layer. However, it may lead to a slow decision making due to communication delay.

Figure 3E:
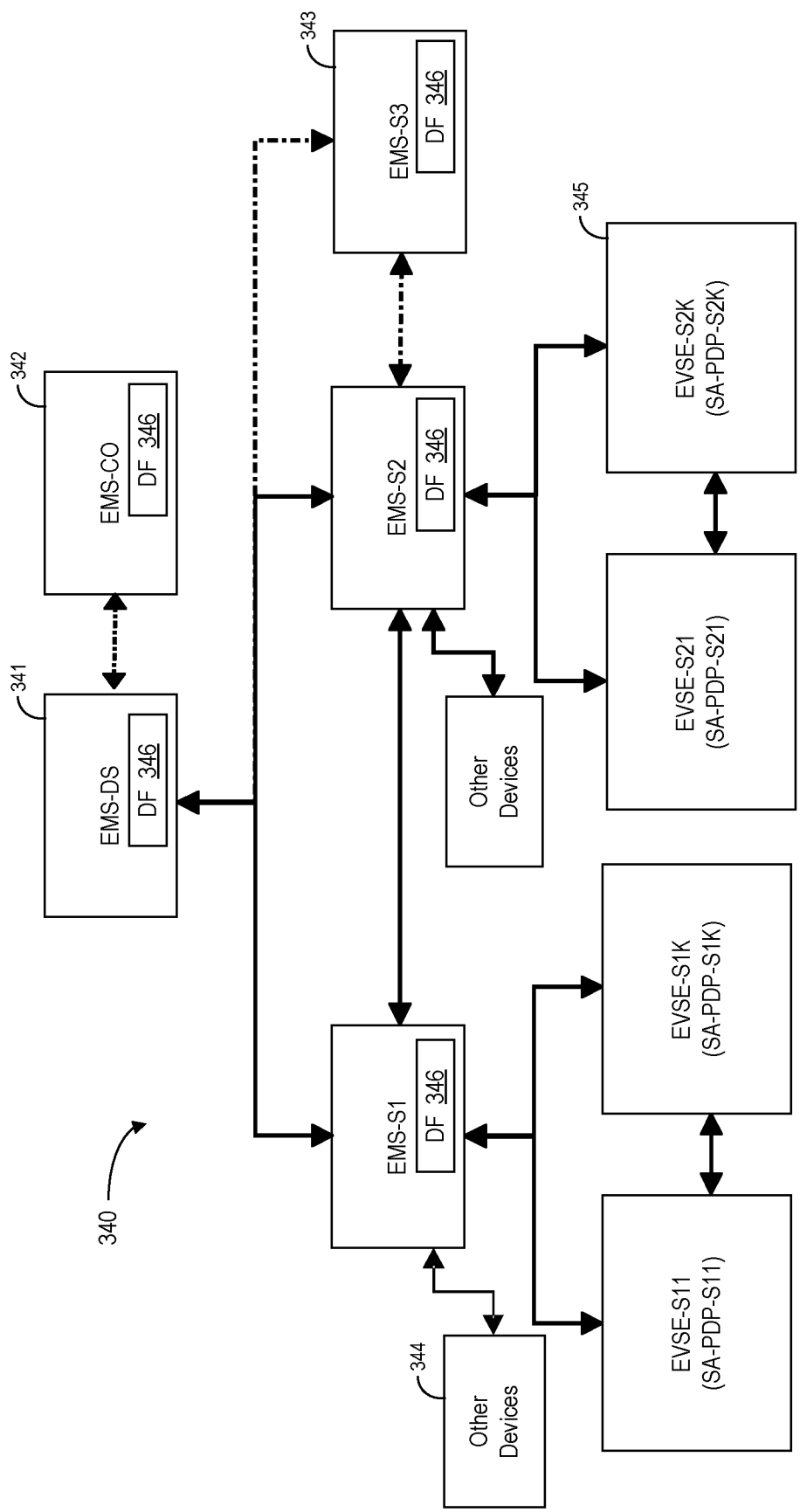

One way around this drawback may be to allow a hierarchical decision fusion (described with respect to FIG. 3E). FIG. 3E shows an embodiment 340 where the DF module 346 is located within both the first layer (an EMS-DS 341 and/or an EMS-CO 342) and the second layer (EMS-Si 343).

Figure 3F:
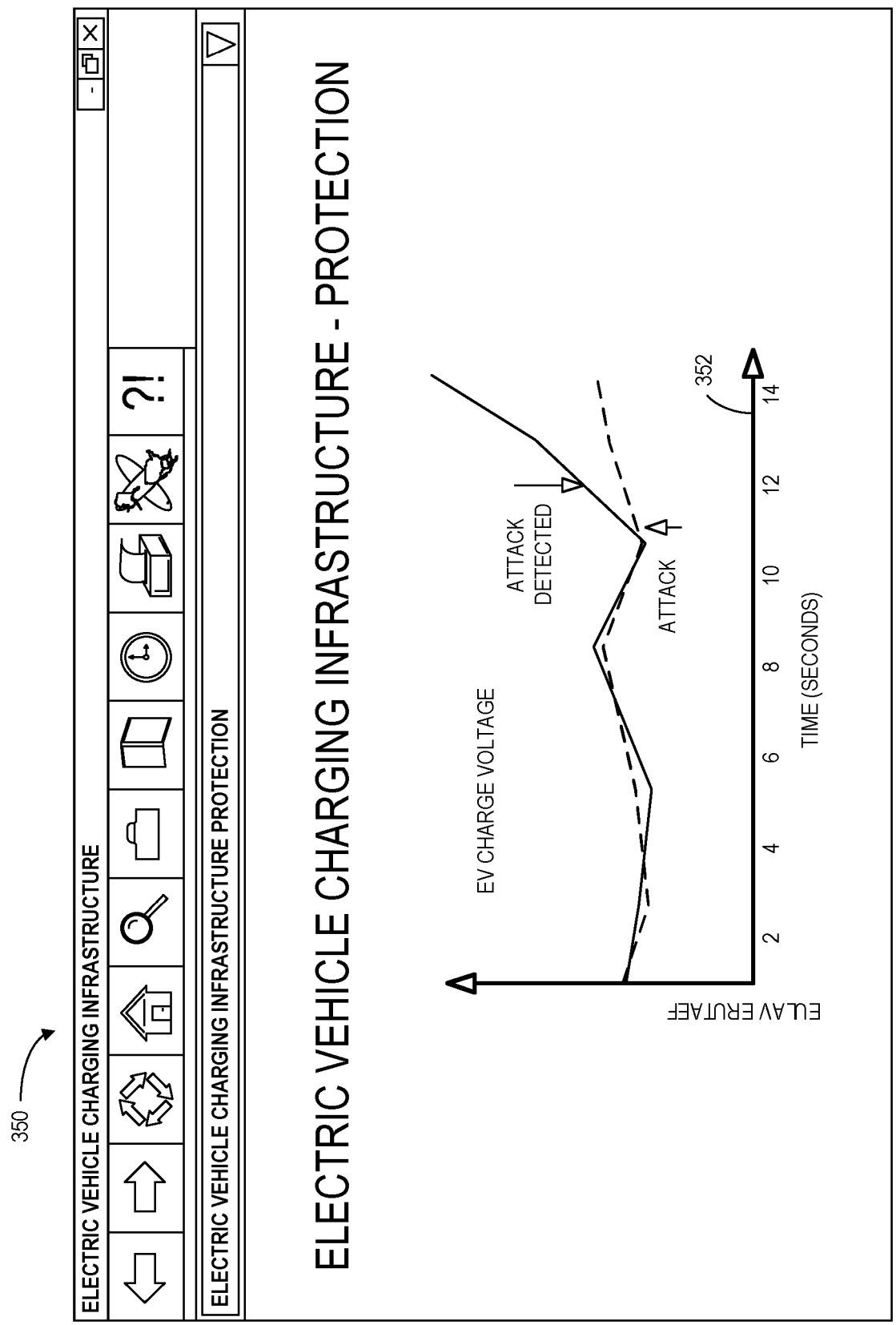
FIG. 3F is a charging system infrastructure protection display according to some embodiments.

In this hierarchical decision fusion strategy, a "divide and conquer" approach may used for the first and second layers. The EMS-Si 343 may aggregate all the necessary information within the charging station to make a cyber protection decision; while the EMS-DS/CO 341/342 may aggregate both the decision output and the device information from each EMS-Si 343 and focus on addressing attacks (such as a covert attack or coordinated attacks on multiple stations). Once detected, the EMS-DS/CO 341/342 may issue notification and accommodation commands to each EMS-Si 343, and each EMS-Si 343 may then transmit the commands to the corresponding devices with the charging stations. FIG. 3F is a charging system infrastructure protection display 350 according to some embodiments. In particular, the interactive Graphical User Interface ("GUI") display 350 provides monitoring node information (e.g., including actual and estimated time series of feature values 352 along and an attack detection indication). According to some embodiments, information about attack statuses may be interwoven between different charging sites. For example, one charging site might be aware of the status of other components (in other charging sites) and such an approach might help thwart coordinated cyber-threats. The display 350 illustrates a feature time series of a first attack example comparing the real-time feature of a monitoring node to the modeled feature of a monitoring node via a graph according to some embodiments. Consider, for example, an attack on EV charging voltage. In this single attack scenario, the system may want to verify whether it can detect and localize the attacked node. As illustrated in FIG. 3E, the attack occurs at t=11 sec. Using the embodiments described herein, the attack is detected within 1 sec and correctly localized to the EV charging voltage. FIG. 3E shows the measured feature time series of the detected and localized attack along with the generated features estimated using stochastic model-based estimation.

Figure 4:
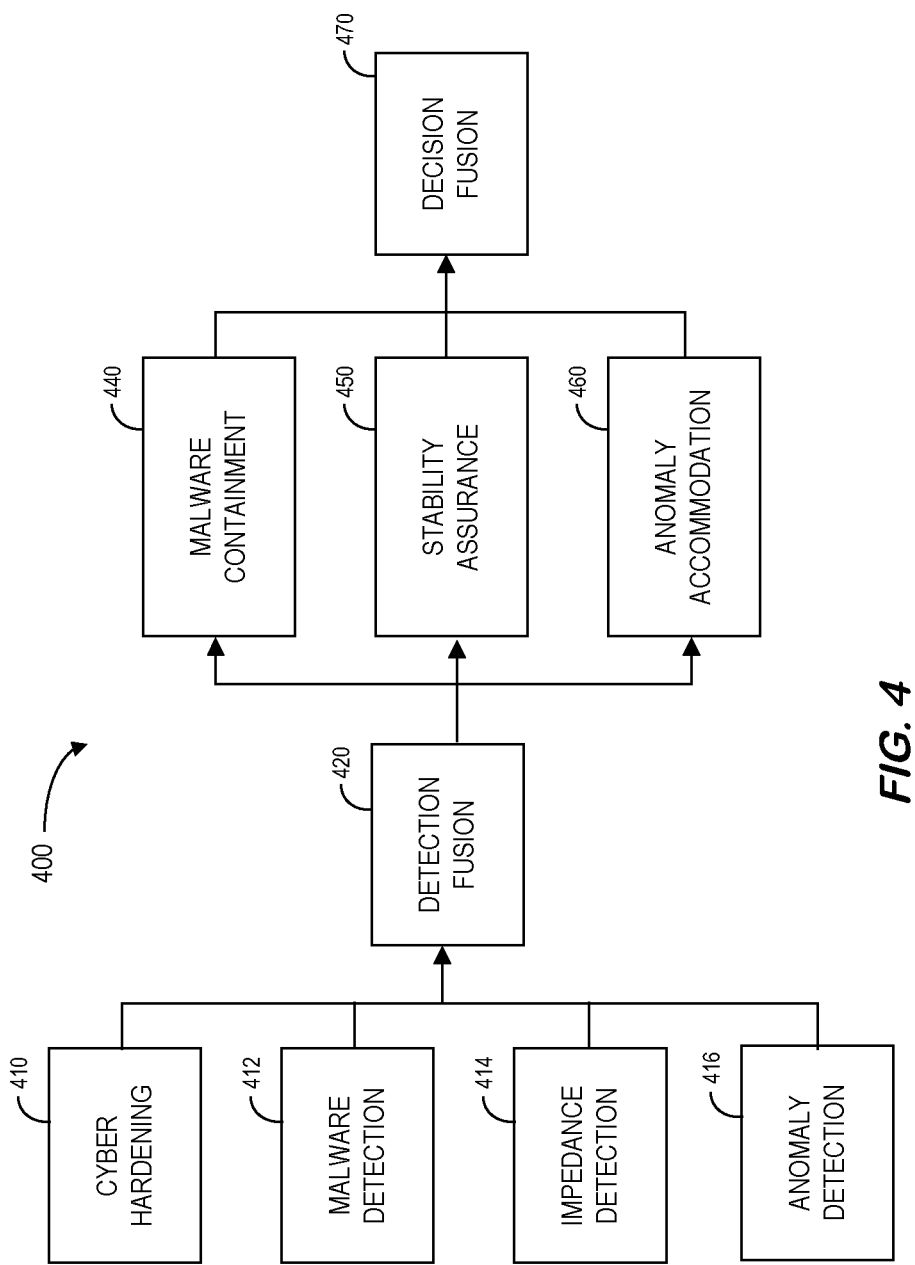
FIG. 4 through 6 illustrate various embodiments for a charging infrastructure protection system.
Figure 5:
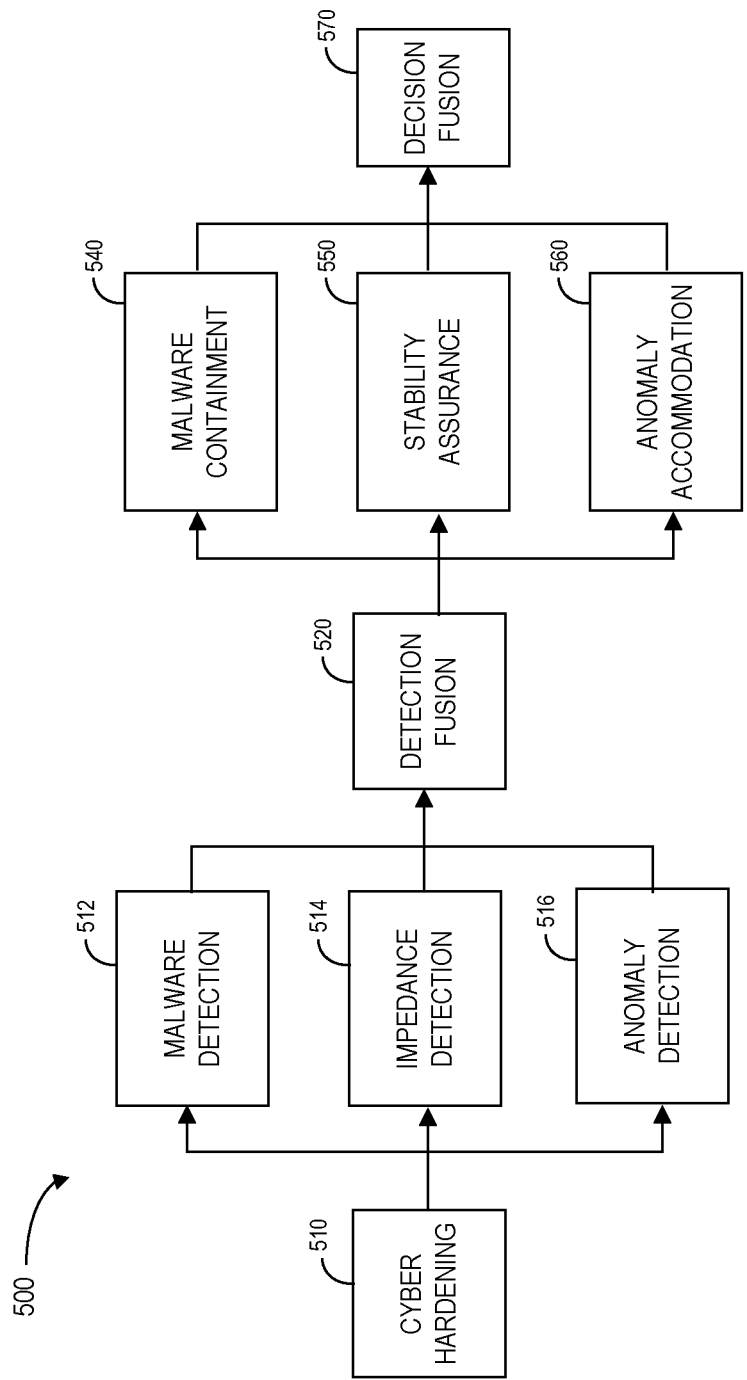
Figure 6:
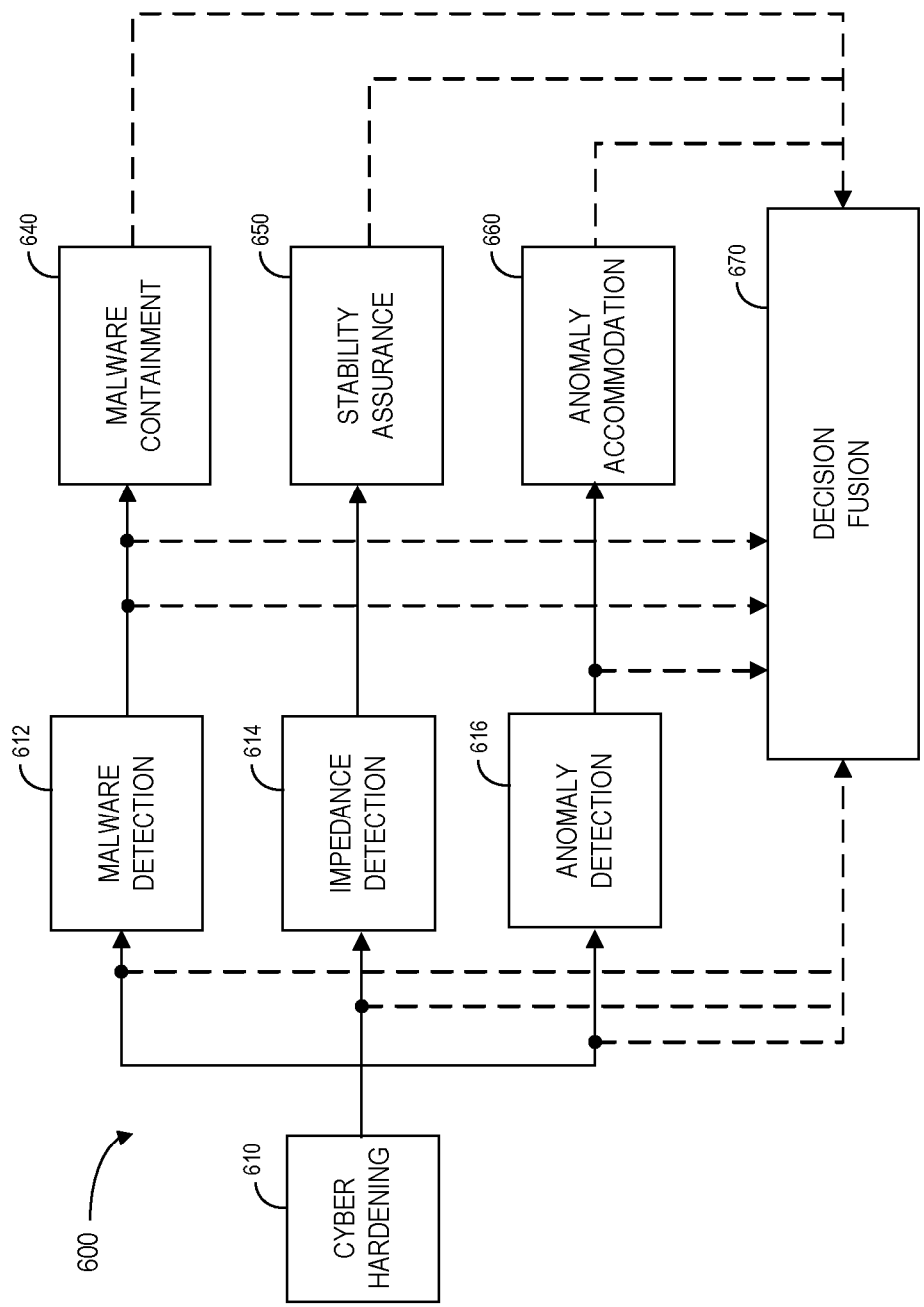

FIG. 4 through 6 illustrate various embodiments for a charging infrastructure protection system. In particular, FIG. 4 illustrates an embodiment 400 in which a detection fusion element 420 receives data from cyber hardening 410, malware detection 412, impedance detection 414, and anomaly detection 416. An output of the detection fusion element 420 may be provided to malware containment 440, stability assurance 450, and anomaly accommodation 460. Outputs from the malware containment 440, the stability assurance 450, and the anomaly accommodation 460 may then be provided to a decision fusion element 470 (which can then provide an indication about normal operation of the electronic vehicle charging infrastructure, a cyber-attack, a fault, etc.).

FIG. 5 illustrates an embodiment 500 in which a cyber hardening element provides information to malware detection 512, impedance detection 514, and anomaly detection 516. A detection fusion element 520 receives data from the malware detection 512, the impedance detection 514, and the anomaly detection 516. An output of the detection fusion element 520 may be provided to malware containment 540, stability assurance 550, and anomaly accommodation 560. Outputs from the malware containment 540, the stability assurance 550, and the anomaly accommodation 560 may then be provided to a decision fusion element 570 (which can then provide an indication about normal operation of the electronic vehicle charging infrastructure, a cyber-attack, a fault, etc.).

As another example, FIG. 6 illustrates an embodiment 600 in which a cyber hardening element provides information to malware detection 612, impedance detection 614, and anomaly detection 616. Outputs from these elements 612, 614, 616 may then be provided directly to malware containment 640, stability assurance 650, and anomaly accommodation 660. The inputs and outputs from all of these elements 612, 614, 616 640, 650, 660 may also be simultaneously provided to a decision fusion element 670 (which can then transmit an indication about normal operation of the electronic vehicle charging infrastructure, a cyber-attack, a fault, etc.).

The Trusted Computing Group ("TCG") defined a Trusted Platform Module ("TPM") and associated protocols. The TPM specification is published both as a TCG Specification and as International Standards Organization ("ISO") document 11889. The TPM's capabilities include: an advanced key manager with sophisticated policies, a means to authenticate the identity of the platform's components (both physical and firmware/software), a hardware-based Random Number Generator ("RNG"), time and monotonic counters, and the ability to store relatively small amounts of policy protected critical data. The TPM's architecture supports multitenancy allowing dedicated keys, etc. owned by an Original Equipment Manufacturer ("OEM") (e.g., the EV or EVSE) to be inaccessible to a user. This supports use cases such as an OEM using TPM feature to manage its own assets (e.g., firmware updates) without providing users access (or even visibility) to those OEM TPM assets.

The TPM has specific keys and features which enable Platform Identity. Note that a platform's identity is a composite of both a "hardware" identity (immutable components) and a software identity (including firmware, which is mutable, changeable, and updatable). The hardware identity may be provided by Platform Certificates authenticated using specific TPM keys. The software identity may be provided by a set of cryptographic hashes of the software components as represented in TPM registers called Platform Configuration Registers ("PCR"). TPMs are widely deployed in Personal Computer ("PC") clients, servers and many infrastructure components such as network routers and switches. TCG has a workgroup defining TPMs for industrial controllers. Operating System ("OS") drivers and application libraries (e.g., Application Programming Interfaces "APIs")) are available for Windows, Linux, and other environments. Note that TCG has defined a set of TPM specifications for automotive applications. Some automotive suppliers have already added TPMs to automobile based on these specifications.

The TCG Trusted Network Connect ("TNC") architecture (adopted by many network equipment operators) defines a set of actors to a query and evaluates and acts on a platform's claimed identity and integrity. Specifically, the architecture includes:
    an Access Requestor ("AR") representing an entity requesting access to network resources;
    a Policy Decision Point ("PDP") representing an entity making a trust decision; and
    a Policy Enforcement Point ("PEP") representing an entity that enforces the decision of the PDP.

Note that the evaluation can work both ways such as with mutual attestation (e.g., a client can be the AR and a server can be the PDP/PEP to start the connection but before continuing the client may require identity and/or attestation of the server. In this case, the server may be the AR and the client may be the PDP/PEP. Both steps may be required to be successful before communications continue.

Figure 7:
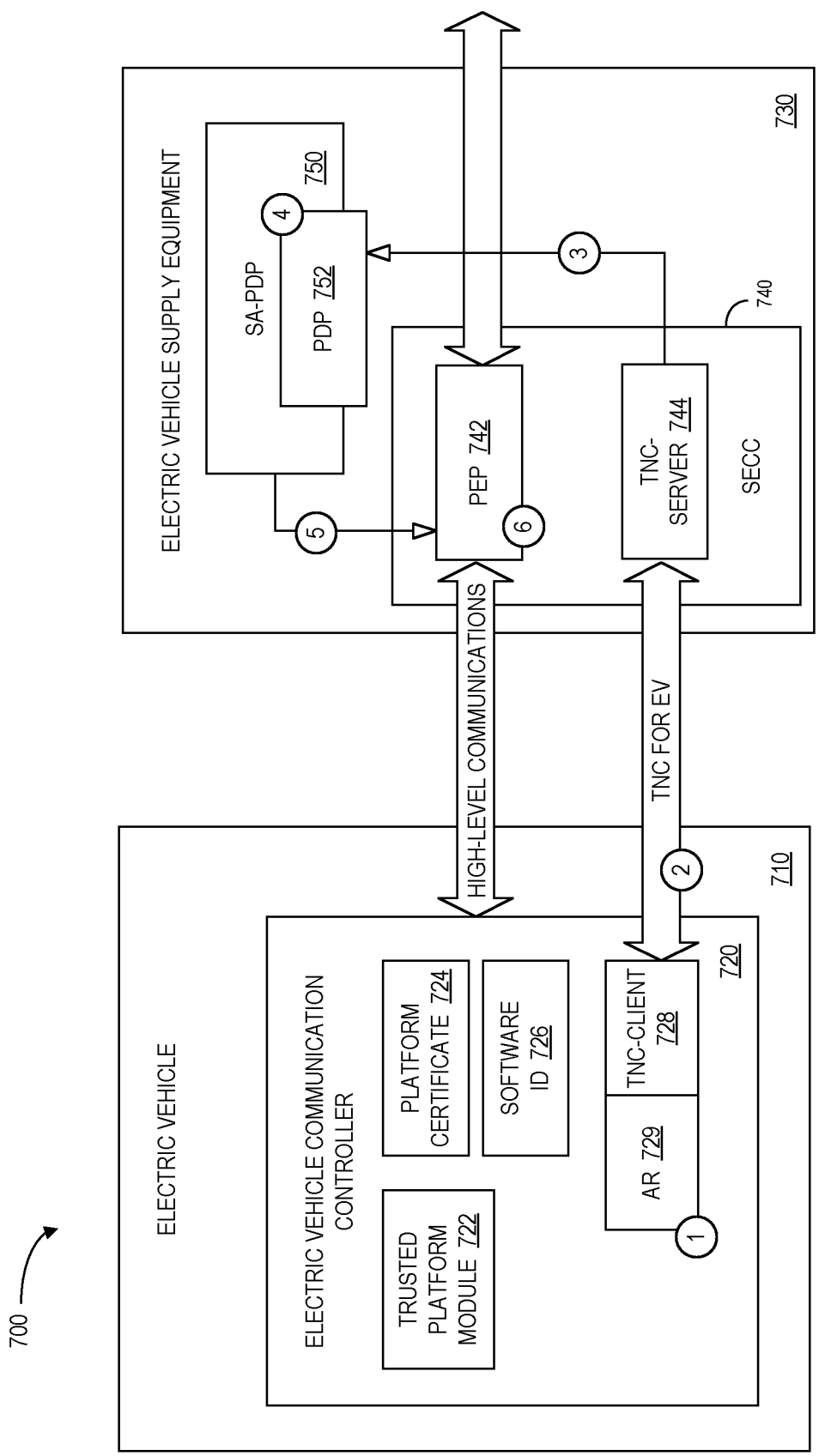
FIG. 7 is an example of IT and OT layer cyber hardening in accordance with some embodiments.

FIG. 7 is an example 700 of IT and OT layer cyber hardening in accordance with some embodiments. An electric vehicle 710 with an Electric Vehicle Communication Controller ("EVCC") 720 may be interested in exchanging information with EVSE 730. The EVCC 720 might include a TPM 722, a platform certificate 724, a software identifier 726, a TNC-client 728, and an AR 729. The EVSE 730 might include a Supply Equipment Communication Controller ("SECC") 740 (with a PEP 742 and a TNC-server 744) and a Secondary Actor Policy Decision Point ("SA-PDP") 750 (associated with a PDP 752). As illustrated in the example 700, the following steps may occur after a physical connection is established (including a wireless connection) but before the initiation of high-level communication:
    at (1), the EVCC 720 acts as an AR 729 requesting access to the SECC 740;
    at (2), the TNC-server 744 of the SECC 740 requests, and the TNC-client 728 of the EVCC 720 responds with, the EVCC platform certificate 724 (and according to some embodiments, the software identifier 726) (e.g., via an International Organization for Standardization ("ISO") 15118 message or similar electric vehicle power standard),
    at (3), the SECC 740 passes the platform certificate 724 (and, according to some embodiments, the software identifier 726) to the SA-PDP 750 as the platform's identity,
    at (4), the SA-PDP 750 evaluates the platform's identity,
    at (5), the SA-PDP 750 sends an action message (e.g., OK, not OK, needs update) message to the SECC 740 acting as a PEP 742, and
    at (6), the SECC 740 allows the high-level communication to proceed (if it received an "OK" message from the SA-PDP 750).

Note that these steps may have a step inserted before in the reverse direction. That is, FIG. 7 illustrates only the sequence where roles are the SECC 740 evaluating the EVCC 720. If the EVCC 720 is evaluating the SECC 740, the functions and protocols may be inverted.

Each decision by the SA-PDP 750 should preservice a part of a set of permanent transactions. Each audit transaction may include the set of inputs into the decision and the resulting actions. These transactions may be used to as an input into malware containment, anomaly detection, forensics, etc. As these systems are distributed, blockchain attestation (e.g., using the secure, distributed transaction ledger 190 of FIG. 1) may provide a distributed transaction log.

Note that the PDP 752 depicted in FIG. 7 could be either a stand-alone module or may be integrated with the decision fusion module 270 of FIG. 2. According to some embodiments, advanced policies may be possible when the PDP 752 is integrated into a decision fusion module 270. For example, the EVSE 730 anomaly detection may be relaxed if the EV 710 is determined to be trusted. Conversely, if the EV 710 trust state cannot be determined (e.g., the EV 710 doesn't support the protocol depicted FIG. 7), the EVSE 730 decision fusion module might apply stricter anomaly detection.

Figure 8:
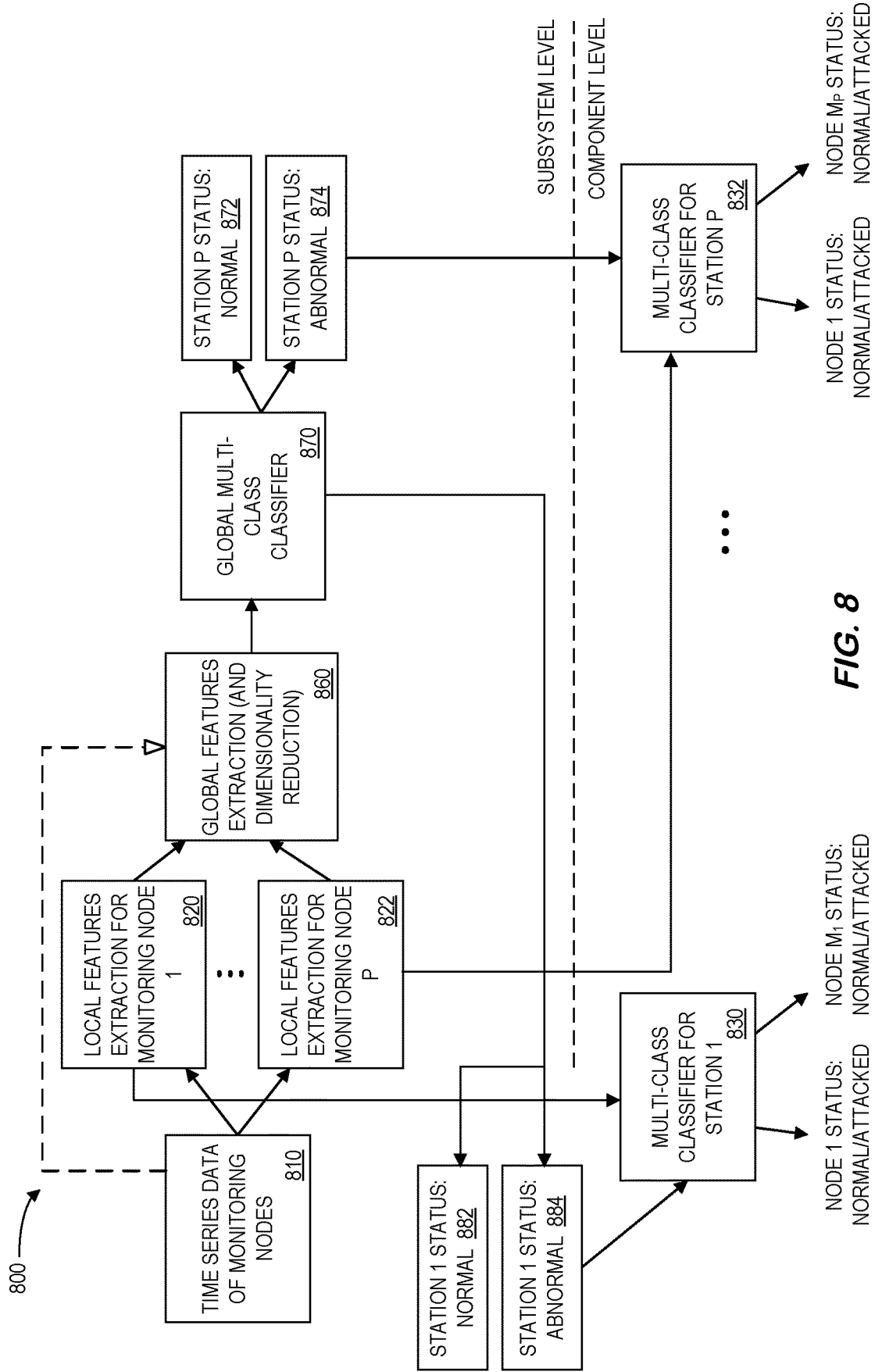
FIG. 8 is a block diagram of a system to provide fast (e.g., in "one shot") cyber-attack detection and localization for the physical layer according to some embodiments.

FIG. 8 is a block diagram of a system 800 to provide fast (e.g., in "one shot") cyber-attack detection and localization for the physical layer according to some embodiments. The system 800 receives time series data of monitoring nodes 810 associated with components of the charging infrastructure. Local features are extracted 820, 822 and global features are determined 860. A global multi-class classifier 870 determines if each station is normal 872, 882 or abnormal 874, 884 (at the subsystem level associated with charging stations. For abnormal stations, a multi-class classifier 830, 832 (which also receives local features) provides normal/attacked data for each node at the component level (within each charging station).

Anomaly detection and localization (isolation) may determine if a system is under attack, and if so, may pinpoint the compromised location(s) within the system. The system may perform this task at the subsystem level, determining which charging station is anomalous. The system may also investigate sublevel localization within each charging station to isolate abnormal nodes in terms of sensors, actuators, or control parameters. In traditional anomaly and fault diagnosis systems, the detection and localization occur in a serial fashion, imposing time delays in the localization. Note, however, that power electronic systems exhibit very fast dynamics which may require attack detection and localization to respond quickly. According to some embodiments, rapid detection and localization occurs in "one shot." Furthermore, embodiments may detect and localize simultaneous anomalies in various locations (i.e., charging stations). This may address multi-prong and coordinated attacks, which can be difficult to detect and localize using traditional methods. Some embodiments may be based on advanced multi-modal feature discovery, along with multi-class classification decision boundaries.

As illustrated in FIG. 8, using a global feature vector (which is extracted from the real-time streaming monitoring nodes data), a global multi-class classifier may determine the status of each charging station as being normal or abnormal. If the status in any station is abnormal, then an individual multi-class classifier determines the status of each monitoring node as normal, attack within that charging station, using the corresponding local feature vector. Note that the system still needs to classify the normal status at the individual node level, since abnormality in even a single node makes the global status abnormal, while some other nodes might still be normal. For each monitoring node, the number of classes for the global multi-class classifier equals to the number charging stations. If there are P charging stations, each having Mi, i=1, . . . P monitoring nodes, this configuration may have one p-class classifier at the subsystem level and p multiclass classifiers, each having Mi, i=1, . . . p classes. Overall, this configuration is a two-layer decision making system, (and the classification decision is made in a rapid and parallel manner).

According to some embodiments, abnormality accommodation may maintain the integrity, operability, and/or availability of the system with/without degrading performance (i.e., curtailment), or the system may command a safe and controlled emergency shutdown (e.g., charging station disconnection). The anomaly accommodation may have two major modules: an emergency shutdown module and a constrained virtual sensing module. These modules may be triggered based on the localization and the attack classification information that is conveyed from the anomaly detection and localization modules.

If the identified attack is not possible to mitigate by using virtual sensing for the attacked nodes (e.g., the controller is compromised), the emergency shutdown module may be triggered. The emergency shutdown module may disconnect the charging station from the grid and the load control mechanism may safely halt the charging of the connected vehicle. However, when the attack vector is proven to be capable of mitigating, a constrained virtual sensing unit may be utilized. This module may reconstruct the sensors in the subsystems that are being attacked using a constrained model-based estimation approach.

Note that control systems in both the transmission and distribution system rely critically upon sensor data. The cyberattacks on sensor data by malicious entity, either through the compromising of a sensor or a man-in-the-middle attack, represents a serious threat to situational awareness. The increasing abundance of sensors in the power grid and their dispersed geographic nature also connotes a large and growing attack surface. It is conceivable that an adversary with malicious intent may seek to compromise one or more sensors in order to effect control decisions that unnecessarily disrupt typical grid operations. For example, once a Phasor Measurement Unit ("PMU"), or a communication channel from a PMU, has been compromised, a hacker may compel this unit or channel to transmit to the Phasor Data Concentrator ("PDC") pre-recorded phasor data resembling that which would have been observed during a real fault event, with an intent to cause the controller to implement protective actions.

Figure 9:
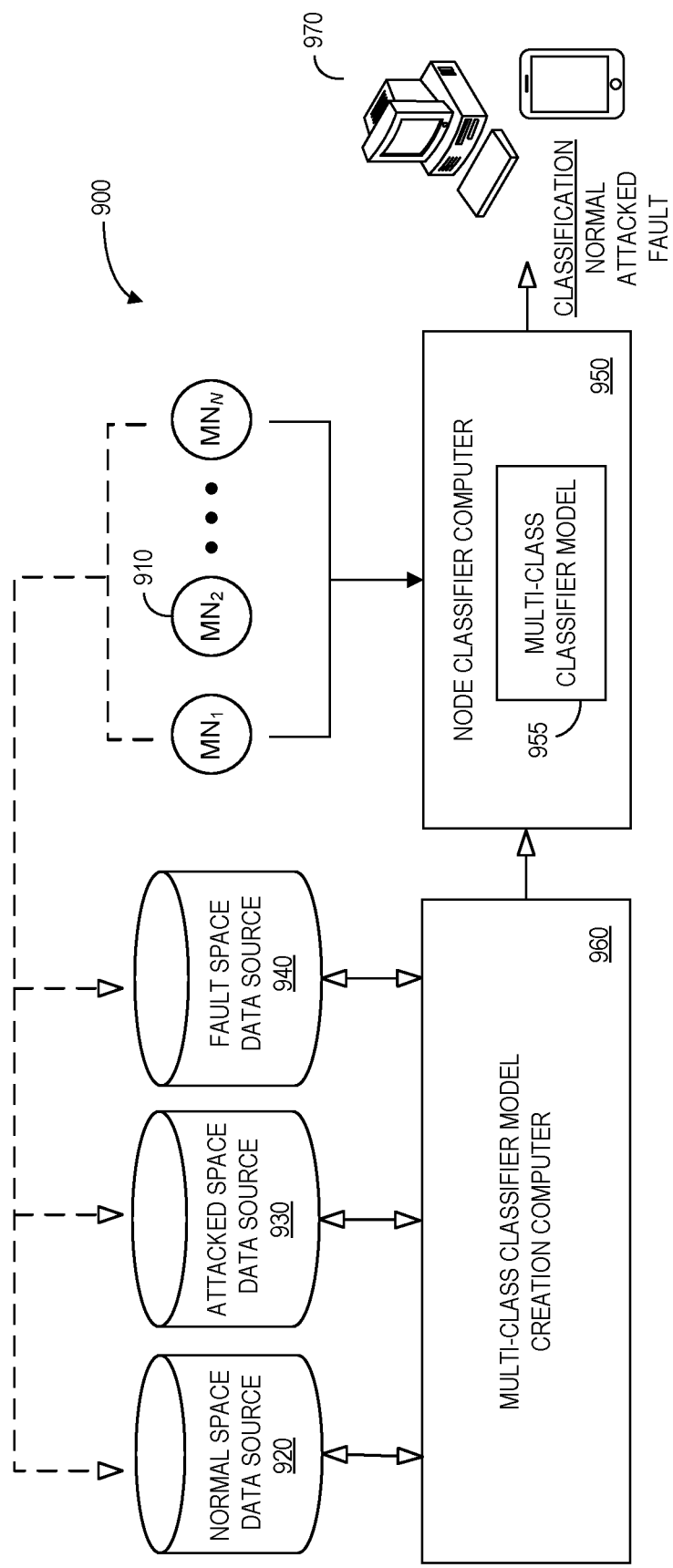
FIG. 9 is a high-level block diagram of a system that may be provided in accordance with some embodiments.

To help address these problems, a feature-based decision boundary may be implemented. For example, FIG. 9 is a high-level architecture of a system 900 in accordance with some embodiments. The system 900 may include a "normal space" data source 920, an "attacked space" data source 930, and a "fault space" data source 940. The normal space data source 920 might store, for each of a plurality of monitoring nodes 910, a series of normal values over time that represent normal operation of an electric vehicle charging infrastructure (e.g., generated by a model or collected from actual monitoring node 930 data as illustrated by the dashed line in FIG. 9). The attacked space data source 920 might store, for each of the monitoring nodes 910, a series of attacked values that represent attacked operation of the electric vehicle charging infrastructure (e.g., when the system is experiencing a cyber-attack). The fault space data source 940 might store, for each of the monitoring nodes 910, a series of fault values that represent operation of the electric vehicle charging infrastructure when a fault or failure has occurred (e.g., a component becomes broken).

Information from the normal space data source 920, the attacked space data source 930, and the fault space data source 940 may be provided to a multi-class classifier model creation computer 960 that uses this data to create a decision boundary (that is, a boundary that separates normal behavior, attacked behavior, and/or fault behavior). The decision boundary may then be used by a node classifier computer 950 executing a multi-class classifier model 955. The multi-class classifier model 955 may, for example, monitor streams of data from the monitoring nodes 910 comprising data from sensor nodes, actuator nodes, and/or any other critical monitoring nodes (e.g., monitoring nodes $MN_1$ through $MN_N$) and automatically output a classification result (e.g., indicating that operation of the electric vehicle charging infrastructure is normal, attacked, or fault) to one or more remote monitoring devices 970 when appropriate (e.g., for display to a user). As used herein, the term "automatically" may refer to, for example, actions that can be performed with little or no human intervention. According to some embodiments, information about detected attack or fault may be transmitted back to an electric vehicle charging infrastructure.

As used herein, devices, including those associated with the system 900 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The multi-class classifier model creation computer 960 may store information into and/or retrieve information from various data stores, such as the normal space data source 920, the attacked space data source 930, and/or the fault space data source 940. The various data sources may be locally stored or reside remote from the multi-class classifier model creation computer 960. Although a single multi-class classifier model creation computer 960 is shown in FIG. 9, any number of such devices may be included. Moreover, various devices described herein might be combined according to embodiments of the present invention. For example, in some embodiments, the multi-class classifier model creation computer 960 and one or more data sources 920, 930, 940 might comprise a single apparatus. The multi-class classifier model creation computer 960 and or node classifier computer 950 functions may be performed by a constellation of networked apparatuses, in a distributed processing or cloud-based architecture.

A user may access the system 900 via one of the monitoring devices 970 (e.g., a Personal Computer ("PC"), tablet, or smartphone) to view information about and/or manage attack and fault information in accordance with any of the embodiments described herein. In some cases, an interactive graphical display interface may let a user define and/or adjust certain parameters (e.g., attack detection trigger levels) and/or provide or receive automatically generated recommendations or results from the multi-class classifier model creation computer 960 and/or the node classifier computer 950.

Figure 10:
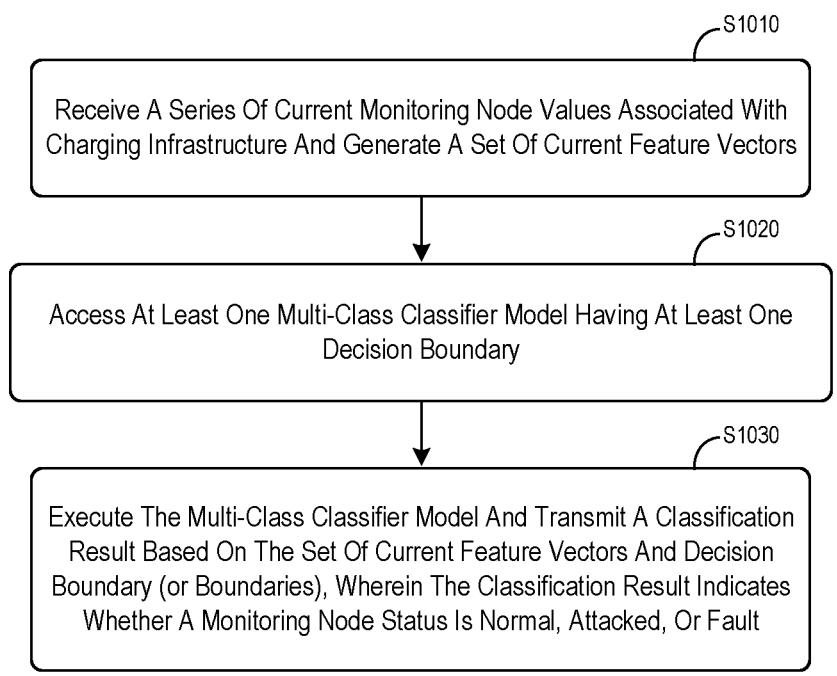
FIG. 10 is an electric vehicle charging infrastructure protection method according to some embodiments.

The decision boundary associated with the multi-class classifier model can be used to detect cyber-attacks and/or naturally occurring faults. For example, FIG. 10 is an electric vehicle charging infrastructure protection method according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S1010, the system may receive, from a plurality of monitoring nodes, a series of current values over time that represent a current operation of an electric vehicle charging infrastructure. The system may also generate, based on the received series of current values, a set of current feature vectors. At S1020, a multi-class classifier model may be accessed including at least one decision boundary. At S1030, the model may be executed and a classification result may be transmitted based on the set of current feature vectors and the decision boundary when appropriate (e.g., when a cyber-attack or fault is detected). According to some embodiments, one or more response actions may be performed when a classification result is transmitted. For example, the system might automatically shut down all or a portion of the electric vehicle charging infrastructure (e.g., to let the detected potential cyber-attack or fault be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system as well as to identify faults. Moreover, according to some embodiments, all monitoring node data may be converted to features using advanced feature-based methods, and the real-time operation of the control system may be monitoring in substantially real-time. Abnormalities may be detected by classifying the monitored data as being "normal", "attacked", or "fault". This decision boundary may be constructed in feature space using dynamic models and may help enable early detection of vulnerabilities (and potentially avert catastrophic failures) allowing an operator to restore the control system to normal operation in a timely fashion.

Figure 11:
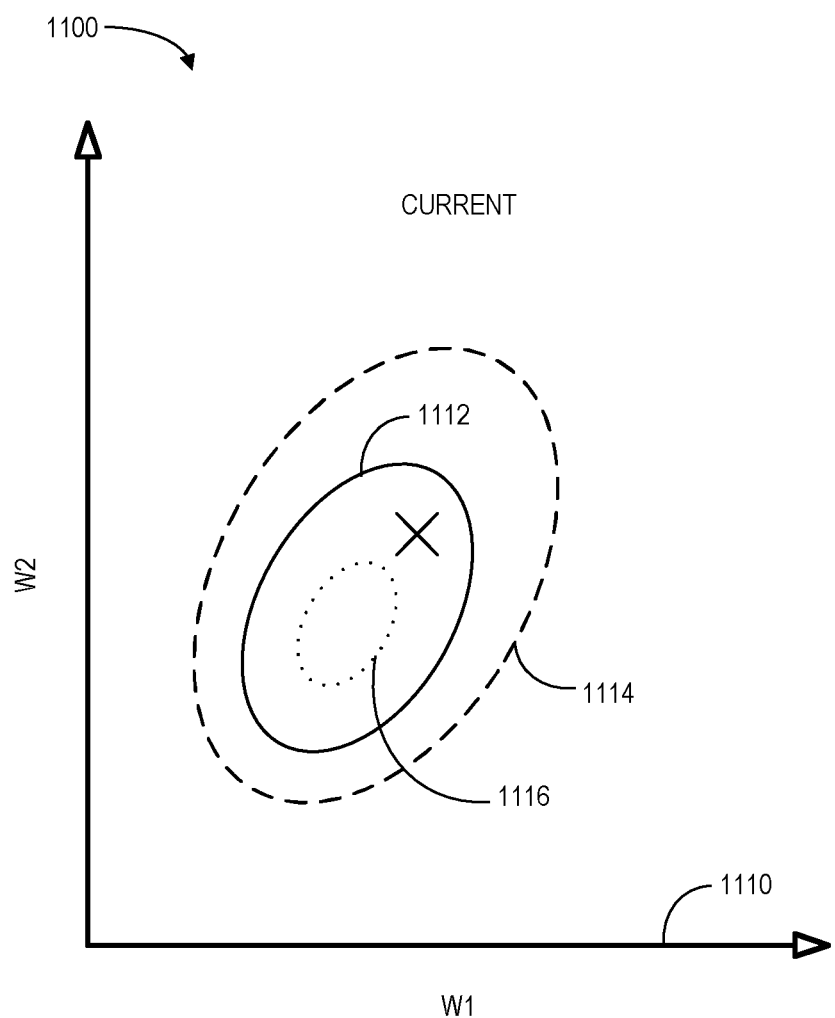
FIGS. 11 and 12 illustrate features, feature vectors, and decision boundaries in accordance with some embodiments.
Figure 12:
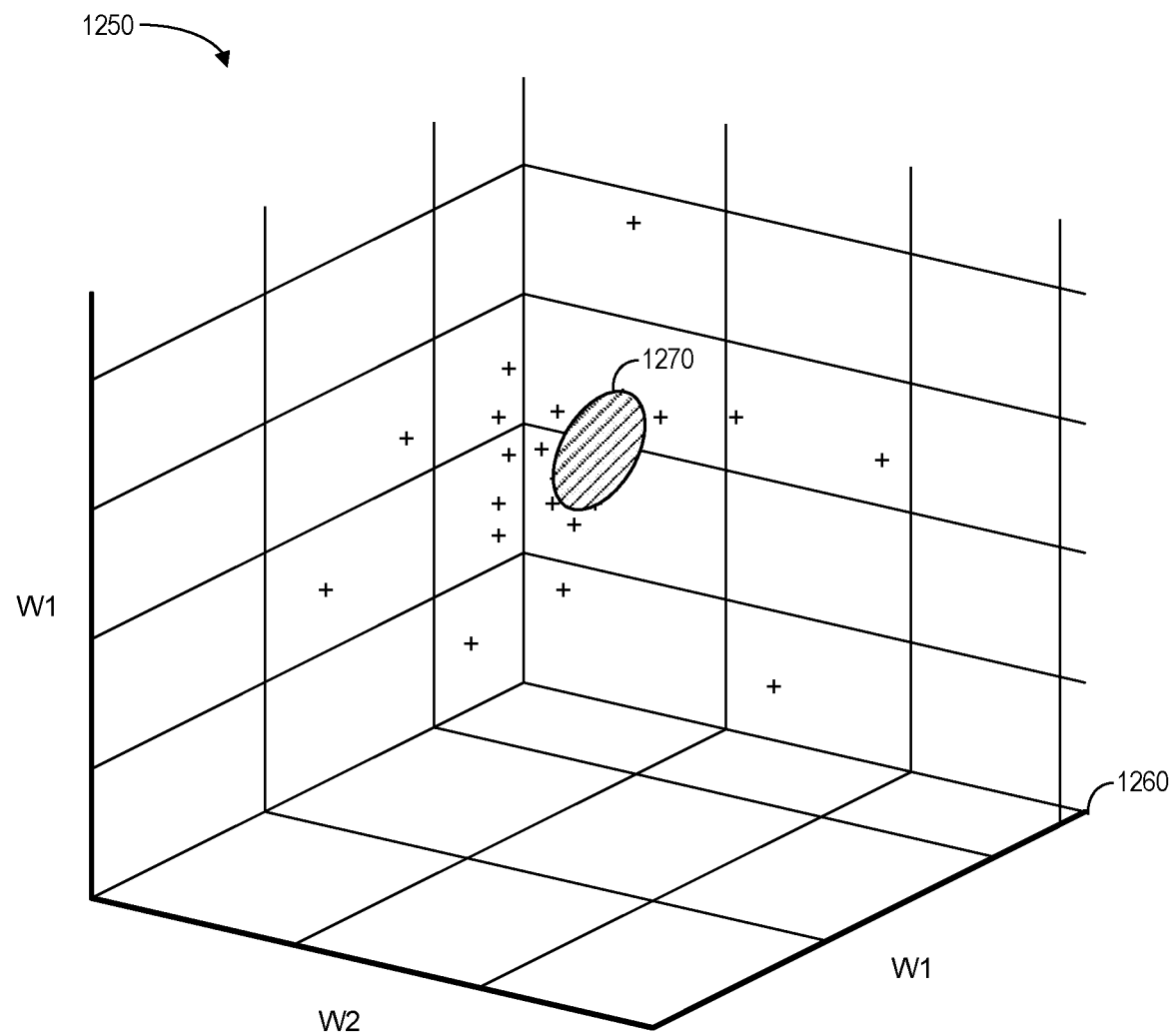

FIGS. 11 and 12 illustrate features, feature vectors, and decision boundaries in accordance with some embodiments. Note that, as used herein, the phrase "decision boundaries" and the term "classifiers" may be used interchangeably and may have the same meaning. In particular, FIG. 11 illustrates 1100 boundaries and feature vectors for a monitoring node parameter in accordance with some embodiments. A graph 1110 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 1110 illustrated in FIG. 11 represents charging current for a charging station but other values might be monitored instead (e.g., volts, load, temperature, etc.). The graph 1110 includes an average boundary 1112 (solid line), a minimum boundary 1114 (dotted line), and a maximum boundary 1116 (dashed line) and an indication associated with current feature location for the monitoring node parameter (illustrated with an "X" on the graph 1110). As illustrated in FIG. 11, the current monitoring node location is between the minimum and maximum boundaries (that is, the "X" is between the dotted and dashed lines). As a result, the system may determine that the operation of the electric vehicle charging infrastructure is normal (and no attack or fault is being detected for that monitoring node).

FIG. 12 illustrates 1250 three dimensions of monitoring node outputs in accordance with some embodiments. In particular, a graph 1260 plots monitoring node outputs ("+") in three dimensions, such as dimensions associated with PCA: w1, w2, and w3. Moreover, the graph 1260 includes an indication of a normal operating space decision boundary 1270. Although a single contiguous boundary 1270 is illustrated in FIG. 12, embodiments might be associated with multiple regions (e.g., associated with attacked and fault regions).

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or any other machine learning techniques) may be used to generate decision boundaries. Since boundaries may be driven by measured data (or data generated from high-fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 13:
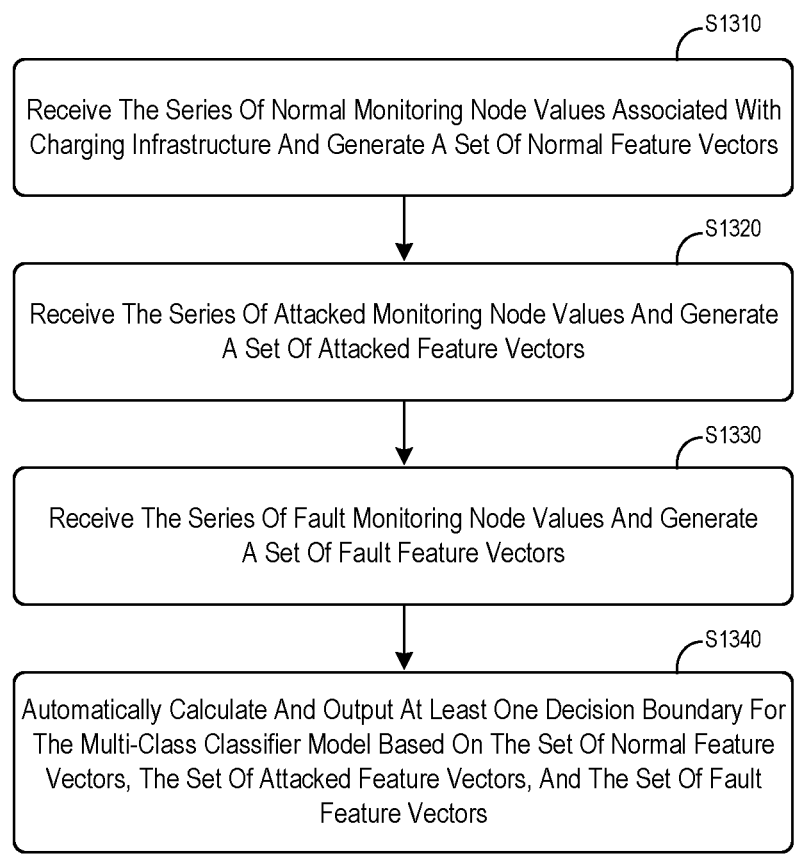
FIG. 13 is a multi-class classifier model creation method according to some embodiments.

FIG. 13 illustrates a model creation method that might be performed by some or all of the elements of the system 900 described with respect to FIG. 9. At S1310, the system may retrieve, for each of a plurality of monitoring nodes, a series of normal values over time that represent normal operation of the electric vehicle charging infrastructure and a set of normal feature vectors may be generated. At S1320 the system may retrieve, for each of the plurality of monitoring nodes, a series of attacked values over time that represent attacked operation of the electric vehicle charging infrastructure and a set of attacked feature vectors may be generated. Similarly, at S1330 the system may retrieve, for each of the plurality of monitoring nodes, a series of fault values over time that represent a fault operation of the electric vehicle charging infrastructure and a set of fault feature vectors may be generated. The series of normal and/or threatened values might be obtained, for example, by running DoE on an electric vehicle charging infrastructure associated with autonomous vehicles including trucks, delivery vehicles, drones, etc. At S1340, a decision boundary may be automatically calculated and output for a multi-class classifier model based on the sets of normal feature vectors, attacked feature vectors, and fault feature vectors. According to some embodiments, the decision boundary might be associated with a line, a hyperplane, a non-linear boundary separating normal space from attacked or fault space, and/or a plurality of decision boundaries. In addition, note that the multi-class classifier model might be associated with the decision boundary, feature mapping functions, and/or feature parameters.

Thus, embodiments may provide a unified system to classify the status of an electric vehicle charging infrastructure having a plurality of monitoring nodes (including sensor, actuator, and controller nodes) as being normal, under a cyber-attack, or fault. The system may be configurable and may distinguish between intelligent adversarial attacks and naturally occurring faults in each monitoring node. Furthermore, in case of a naturally occurring fault, some embodiments may determine a specific failure mode for each monitoring node. This may enable tailored, resilient, and fault-tolerant control remedies against cyber-attacks and faults.

Some embodiments consist of a collection of layered multi-class classifiers which together determine the status of each monitoring node as being normal, under attack, or faulty (and, in some cases, may also categorize the type of fault that has occurred). The multi-class decision systems might be arranged in various configurations (e.g., as described in connection with FIGS. 16 through 21) of interconnected classifiers. For a particular application, these configurations may exhibit different performance and computational demands. An appropriate configuration may be selected for an available data set based on required performance and available on-line computational power. Note that this selection might be automatically performed by an algorithm.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or Receiver Operator Characteristic ("ROC") statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technic such as PCA. Note that the features may be calculated over a sliding window of the signal time series and the length of the window (and the duration of slide) may be determined from domain knowledge and inspection of the data or using batch processing.

According to some embodiments, information about threats, spoofing, attack vectors, vulnerabilities, faults, etc. may be provided to models and/or a training and evaluation database created using DoE techniques. The models may, for example, simulate data from monitoring nodes to be used to compute features that are assembled into a feature vector to be stored in the training and evaluation database. The data in the training and evaluation database may then be used to compute decision boundaries to distinguish between normal operation, attacked operation, and fault operation. According to some embodiments, the models may comprise high-fidelity models that can be used to create a data set (e.g., a set that describes attacked and/or fault space). The data from the monitoring nodes might be, for example, quantities that are captured for a length of from 30 to 50 seconds from sensor nodes, actuator nodes, and/or controller nodes (and a similar data set may be obtained for "levels of normal operating conditions in the system versus quantities from the monitoring nodes"). Since attacks might be multi-prong (e.g., multiple attacks or faults might happen at once), DoE experiments may be designed to capture the attack and fault space (e.g., using full factorial, Taguchi screening, central composite, and/or Box-Behnken). When models are not available, these DoE methods can also be used to collect data from real-world asset control system. Experiments may run, for example, using different combinations of simultaneous attacks and faults. Similar experiments may be run to create a data set for the normal operating space.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time threat detection, decisions may be made by comparing where each point falls with respect to a decision boundary that separates the space between two regions (or spaces): abnormal ("attack" or "fault") space and normal operating space. If the point falls in the abnormal space, the electric vehicle charging infrastructure is undergoing an abnormal operation such as during a cyber-attack. If the point falls in the normal operating space, the electric vehicle charging infrastructure is not undergoing an abnormal operation such as during a cyber-attack. Appropriate decision zone with boundaries are constructed using data sets as described herein with high-fidelity models. For example, support vector machines may be used with a kernel function to construct a decision boundary. According to some embodiments, deep learning techniques may also be used to construct decision boundaries.

Figure 14:
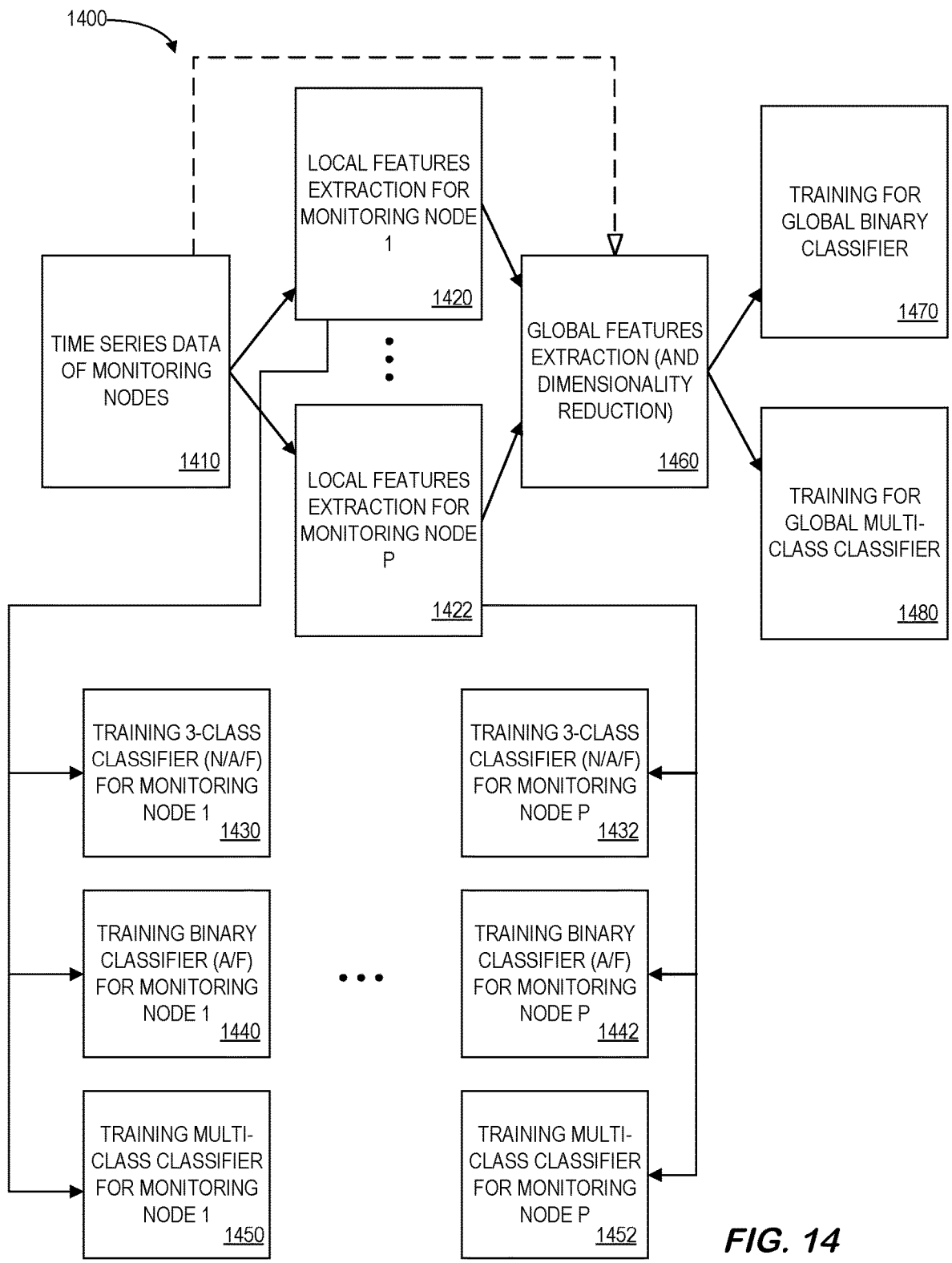
FIG. 14 illustrates an off-line training process in accordance with some embodiments.

FIG. 14 illustrates an off-line training process 1400 in accordance with some embodiments. At 1410, time series data of P monitoring nodes are received and local features are extracted for each of the monitoring nodes at 1420, 1422. The local features are provided to: (i) train a 3-class classifier (normal ("N"), attacked ("A"), and fault ("F")) for monitoring node 1 at 1430; (ii) train a binary classifier (A/F) for monitoring node 1 at 1440, and (iii) train a multi-class classifier for monitoring node 1 at 1450. The process is repeated to train classifiers for all P monitoring nodes at 1432, 1442, 1452. Note that fewer than all of the classifiers might be trained depending on the electric vehicle charging infrastructure protection configuration that is being implemented (and the determination of which classifiers to train might be an automatic process).

Note that during the training phase, normal, attack, and fault data sets may be generated and their corresponding features may be extracted. The normal data may be collected during different operational modes of the asset and different ambient conditions. The attack data set may comprise different attack types of different severity, and the fault data set may consist of data associated with different failure modes of each monitoring node. The data sets may be generated using physics-based or data-driven models, or collected from the field.

According to some embodiments, the local features are provided to a global features extraction process (and dimensionality reduction) at 1460. The results of this process can then be provided to train a global binary classifier 1470 and/or a global multi-class classifier 1480. That is, the local features may be extracted for each monitoring node from their corresponding time-series data for the local feature vectors. Then local feature vectors may then be stacked to create the global feature vector. The global feature vector may also contain, according to some embodiments, interactive features for two or multiple node for which the time-series data is used again (as illustrated by the dashed arrow in FIG. 14). The dimension of the global feature vector may be reduced to increase computational efficiency. Repeating this process for all the time series in the data set, results in a set of local and global feature vectors. The global feature vector may then be used to train a global binary classifier (making the global decision of "normal" vs. "abnormal" system status) and/or a global multi-class classifier. The binary classifiers can be trained using binary classification methods such as Support Vector Machines ("SVM"), Extreme Learning Machine ("ELM") neural network, deep neural networks, etc. The multiclass classifiers of three classes or more, can be trained using multi-class classification methods such as kernel-ELM (ELM with a nonlinear kernel, such as a Gaussian or wavelet kernel), decision trees, and multi-class SVM. The decision boundaries computed for each classifier may be stored to be used during the real-time operation.

Figure 15:
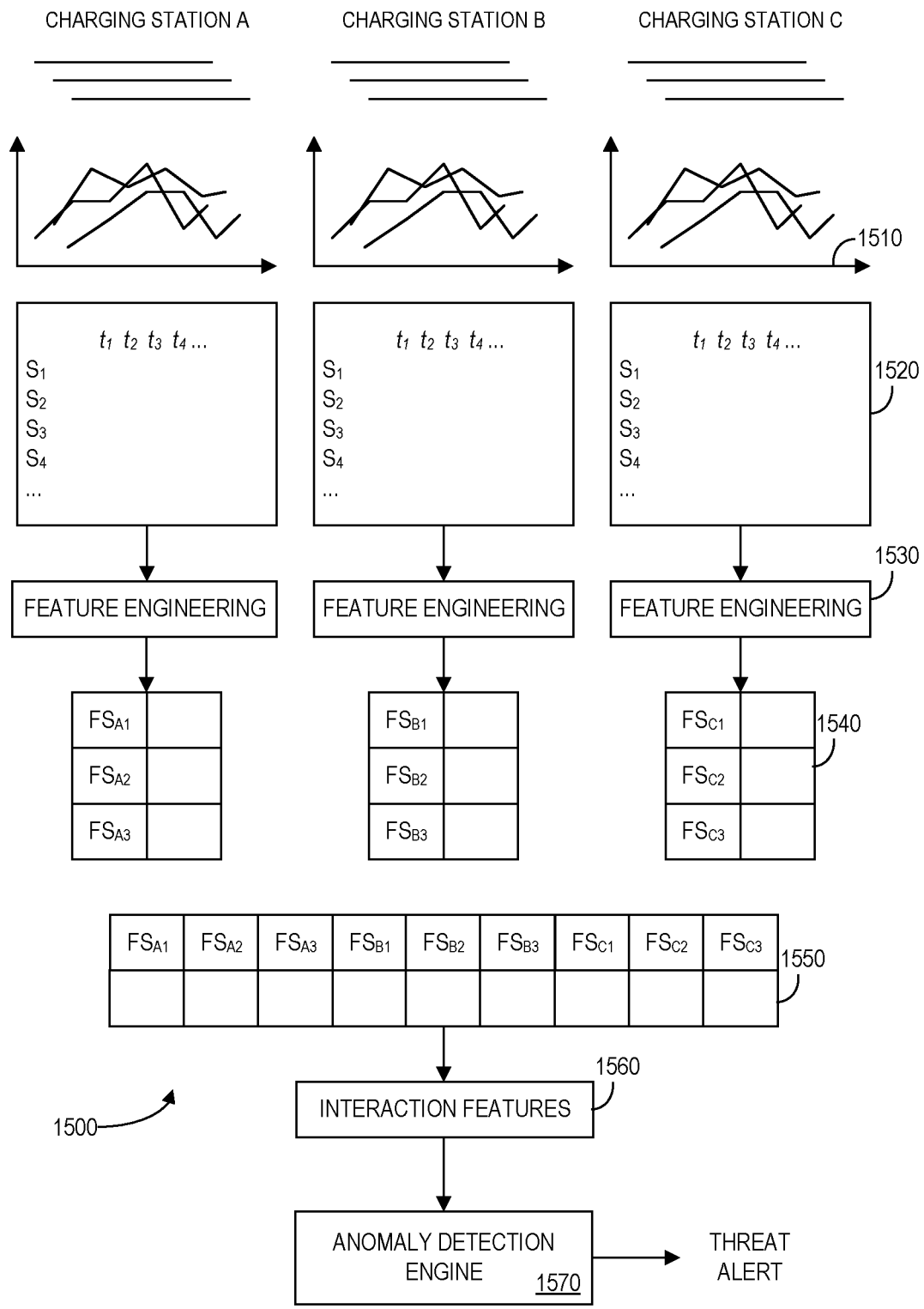
FIG. 15 illustrates global features according to some embodiments.

FIG. 15 is an example of a global threat protection system 1500 in accordance with some embodiments. In particular, system includes three charging stations (A, B, and C) and batches of values 1510 from monitoring nodes are collected for each generated over a period of time (e.g., 30 to 50 seconds). According to some embodiments, the batches of values 1510 from monitoring nodes overlap in time. The values 1510 from monitoring nodes may, for example, be stored in a matrix 1520 arranged by time ($t_1$, $t_2$, etc.) and by type of monitoring node ($S_1$, $S_2$, etc.). Feature engineering components 1530 may use information in each matrix 1520 to create a feature vector 1540 for each of the three generators (e.g., the feature vector 1540 for generator C might include $FS_{C1}$, $FS_{C2}$, etc.). The three feature vectors 1540 may then be combined into a single global feature vector 1550 for the system 1500. Interaction features 1560 may be applied (e.g., associated with A*B*C, A+B+C, etc.) and an anomaly detection engine 1570 may compare the result with a decision boundary and output a classification result when appropriate.

Figure 16:
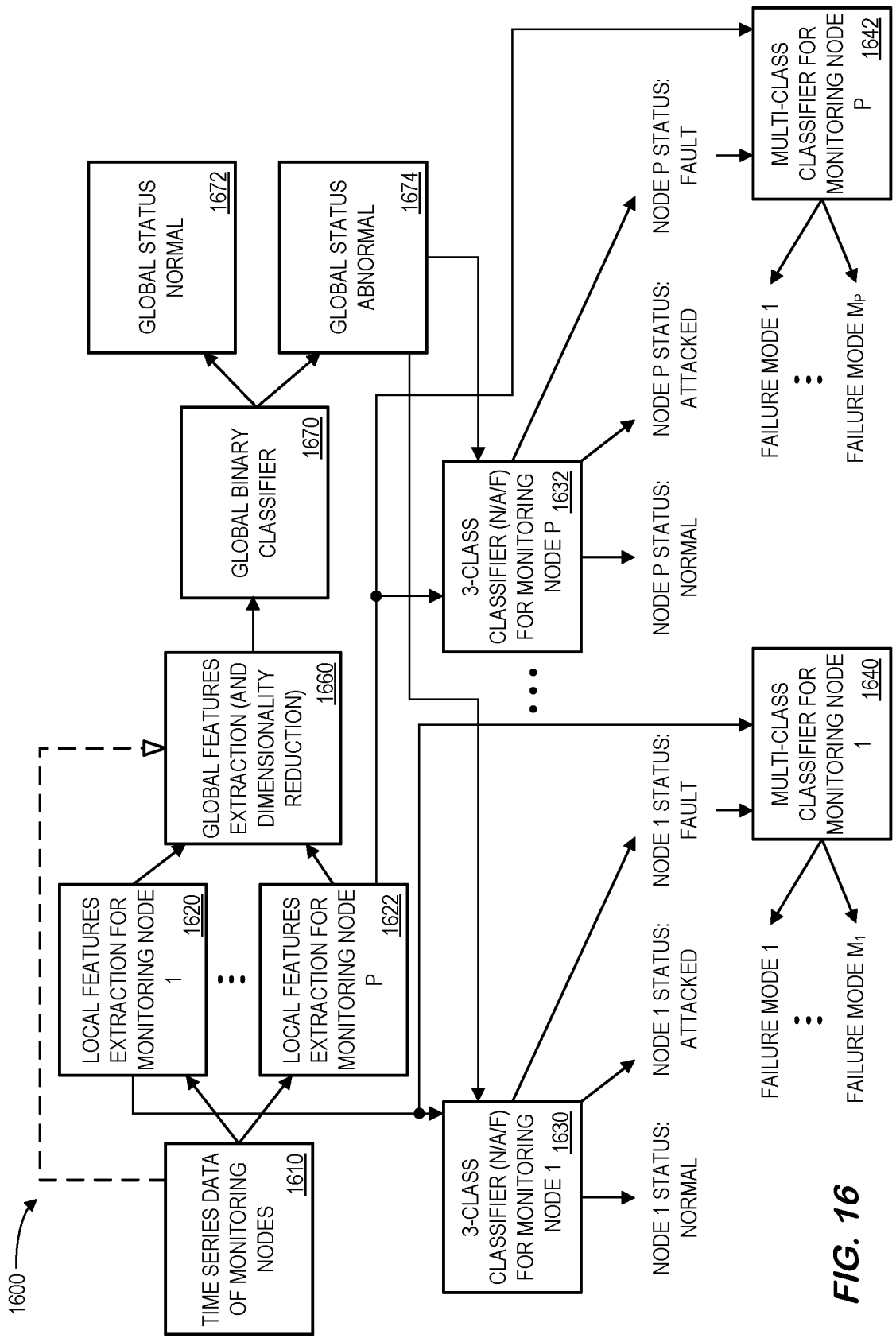
FIGS. 16 through 21 illustrate online node classification configurations in accordance with some embodiments.

After the appropriate local and global classifiers have been trained, they can be used in real-time to monitor an electric vehicle charging infrastructure. Note that many different configurations of classifiers could be implemented. In particular, FIGS. 16 through 21 will describe several specific implementations but embodiments could be configured in any number of other different ways. FIG. 16 illustrates an online node classification configuration 1600 in accordance with some embodiments. In this configuration 1600, time series data of monitoring nodes 1610 is used to extract local features for each of P nodes 1620, 1622 as well as to extract global features (at which point dimensionality reduction may be performed) 1660. The global features may be provided to a global binary classifier 1670. If the global binary classifier 1670 indicates that the global status is normal 1672, the process may end (e.g., that is, since everything seems to be operating properly there may be no need to evaluate each individual node).

If the global binary classifier 1670, however, indicates that the global status is abnormal 1674 (that is, an attack or fault might exist at various nodes), a 3-class classifier (N/A/F) 1630, 1632 may be executed using the local features for each node. The 3-class classifier 1630, 1632 will indicate whether a particular node is normal, attacked, or fault. In the case of fault, a multi-class classifier 1640, 1642 may be executed for each node (using the local features) to determine a particular failure mode (e.g., mode 1 through M). Note that in this configuration 1600, the number of classes for the multi-class classifier 1640, 1642 equals the number of different failure modes for that particular node. So, if there are P monitoring nodes, each having $M_i$ (i=1, ... , P) failure modes, the configuration will have P 3-class classifiers 1630, 1632 and P multi-class classifiers 1640, 1642, each having $M_i$ classes, in addition to one global binary classifier 1670. Overall, this configuration 1600 is a three-layer decision making system and the classification decision is made in a hierarchical manner.

Figure 17:
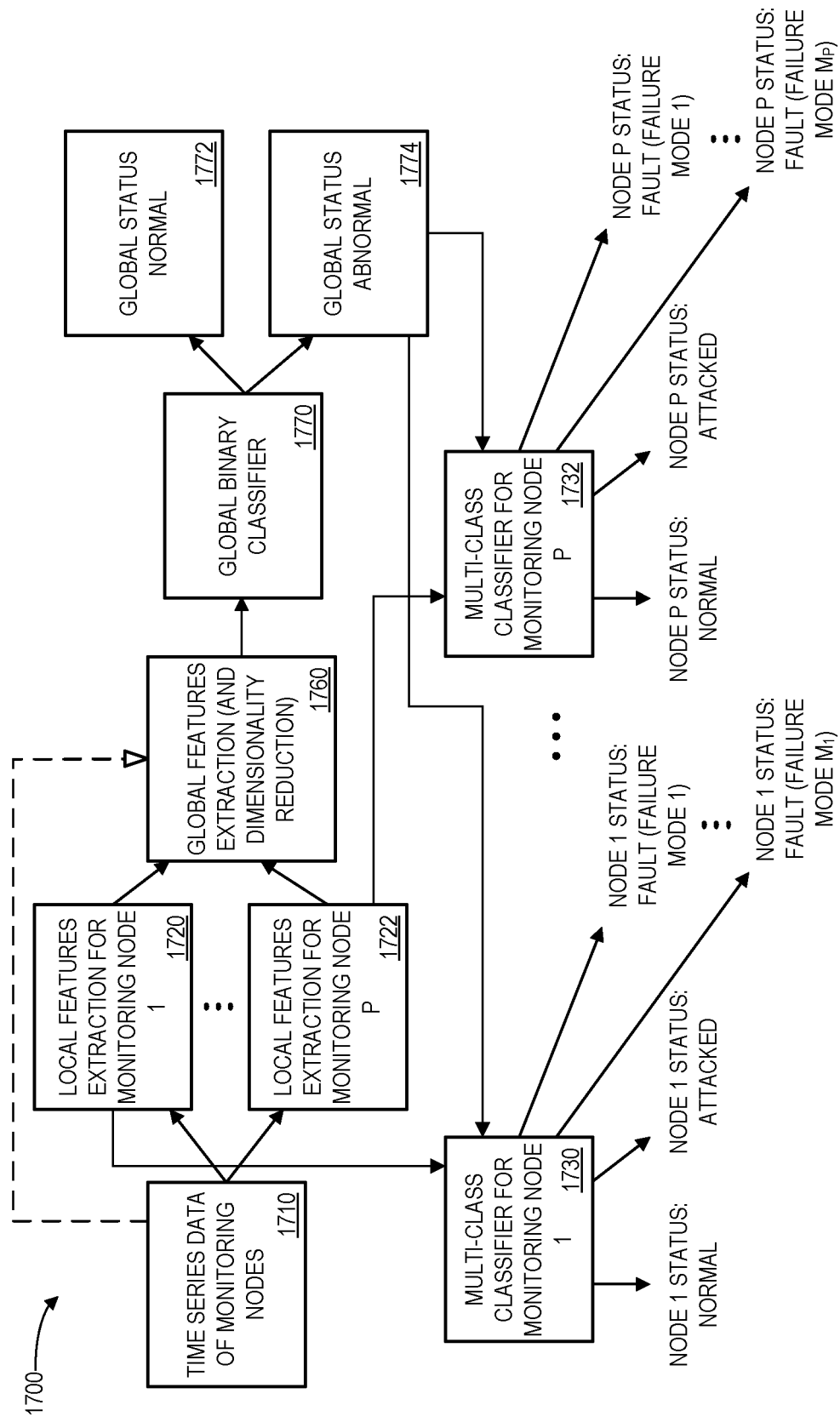

FIG. 17 illustrates an online node classification configuration 1700 in accordance with some embodiments. As before, time series data of monitoring nodes 1710 is used to extract local features for each of P nodes 1720, 1722 as well as to extract global features (at which point dimensionality reduction may be performed) 1760. The global features may be provided to a global binary classifier 1770. If the global binary classifier 1770 indicates that the global status is normal 1772, the process may end (e.g., that is, since everything seems to be operating properly there may be no need to evaluate each individual node).

If the global binary classifier 1770, however, indicates that the global status is abnormal 1774 (that is, an attack or fault might exist at various nodes), a multi-class classifier 1730, 1732 may be executed using the local features for each node. The multi-class classifier 1730, 1732 will indicate whether a particular node is normal, attacked, or in one of a pre-determined number of failure modes. This configuration 1700 has a single global binary classifier 1770, and P (number of nodes) multi-class classifiers 1730, 1732 (each having $M_i$+2 classes). Compared to the configuration 1600 of FIG. 16, this configuration 1700 has a simplified structure but higher complexity in the classifiers at the second layer.

Figure 18:
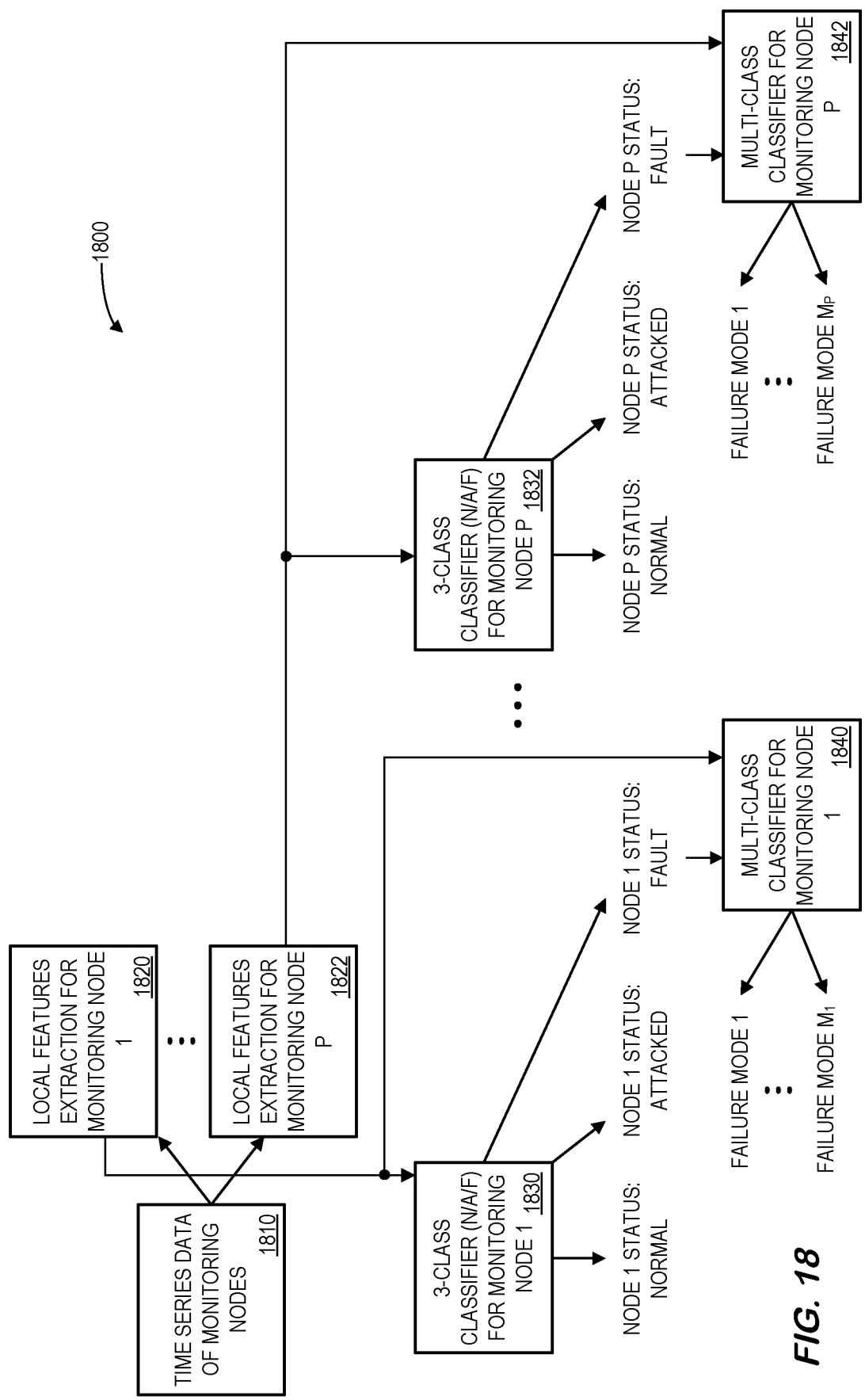

FIG. 18 illustrates an online node classification configuration 1800 in accordance with some embodiments. In this configuration 1800, time series data of monitoring nodes 1810 is used to extract local features for each of P nodes 1820, 1822. A 3-class classifier (N/A/F) 1830, 1832 is then executed using the local features for each node. The 3-class classifier 1830, 1832 will indicate whether a particular node is normal, attacked, or fault. In the case of fault, a multi-class classifier 1840, 1842 may be executed for each node (using the local features) to determine a particular failure mode (e.g., mode 1 through M). In this configuration 1800, the local decision is directly made without using any prior global decision. This simplifies the decision process and the training phase but needs more real-time computations. Note that in configurations 1600, 1700 only a subset of classifiers is active at each instant. For example, in configuration 1600, as long as the global system status is normal, all classifiers at the second and third layers are dormant (saving a lot of real-time computations). However, in this configuration 1800 all classifiers at the first layer must remain active all the time. On the other hand, using this configuration 1800 the global status is inferred as a readily available by-product (without any additional computations or training). As seen in the FIG. 18, this is a two-layer configuration with P 3-class classifiers 1830, 1832 at the first layer and P multi-class (failure modes) classifiers 1840, 1842 at the second layer.

Figure 19:
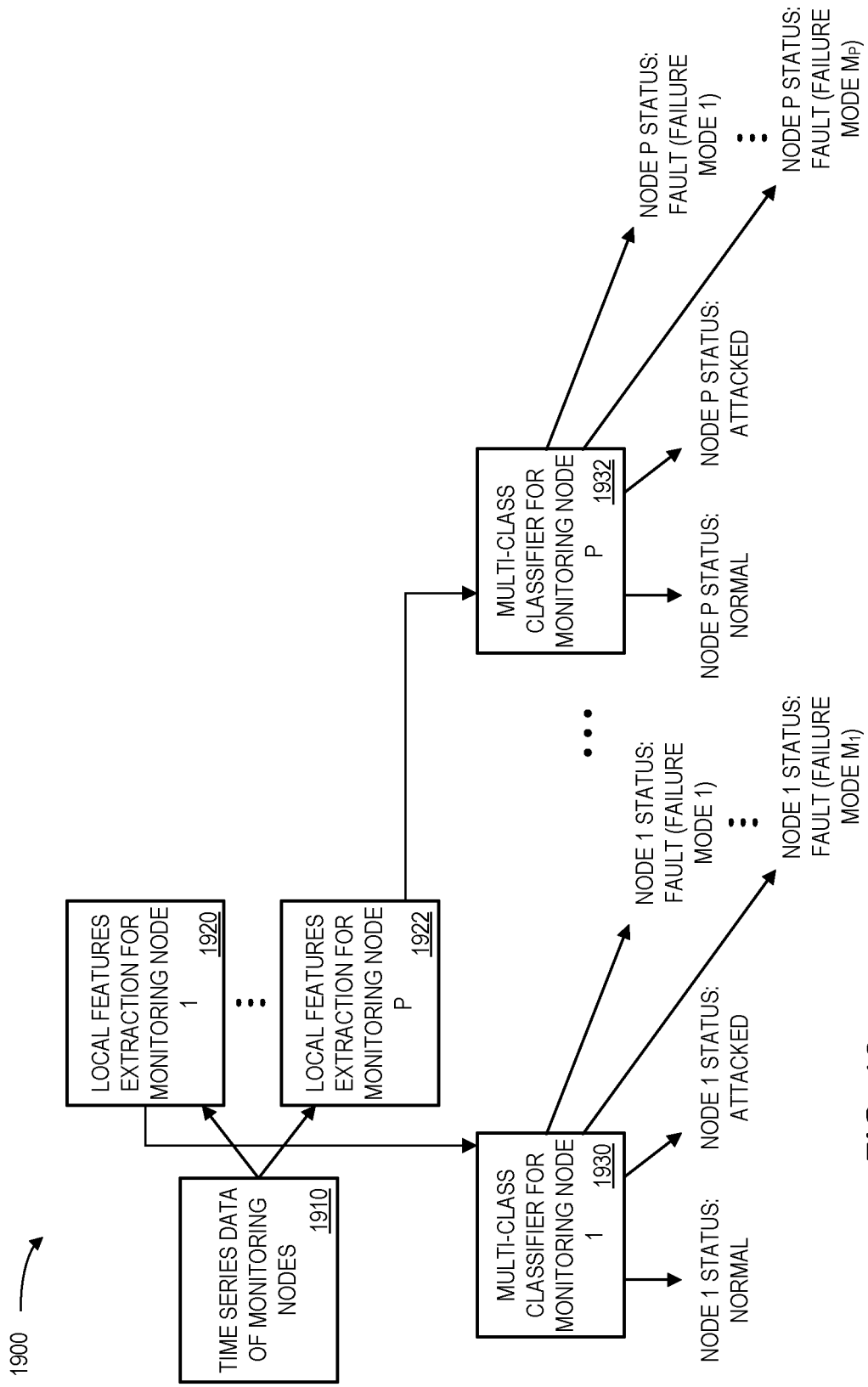

FIG. 19 illustrates an online node classification configuration 1900 in accordance with some embodiments. In this configuration 1900, time series data of monitoring nodes 1910 is used to extract local features for each of P nodes 1920, 1922. A multi-class classifier 1930, 1932 is then executed using the local features for each node. The multi-class classifier 1930, 1932 will indicate whether a particular node is normal, attacked, or in a particular failure mode (e.g., mode 1 through M). This is the simplest configuration 1900 in terms of the decision process but the most complex in terms of training the classifiers. As seen in FIG. 19, this is single-layer configuration comprising of P multi-class classifiers 1930, 1932 (each having $M_i$+2 classes). Like configuration 1800, all classifiers must always remain active.

Figure 20:
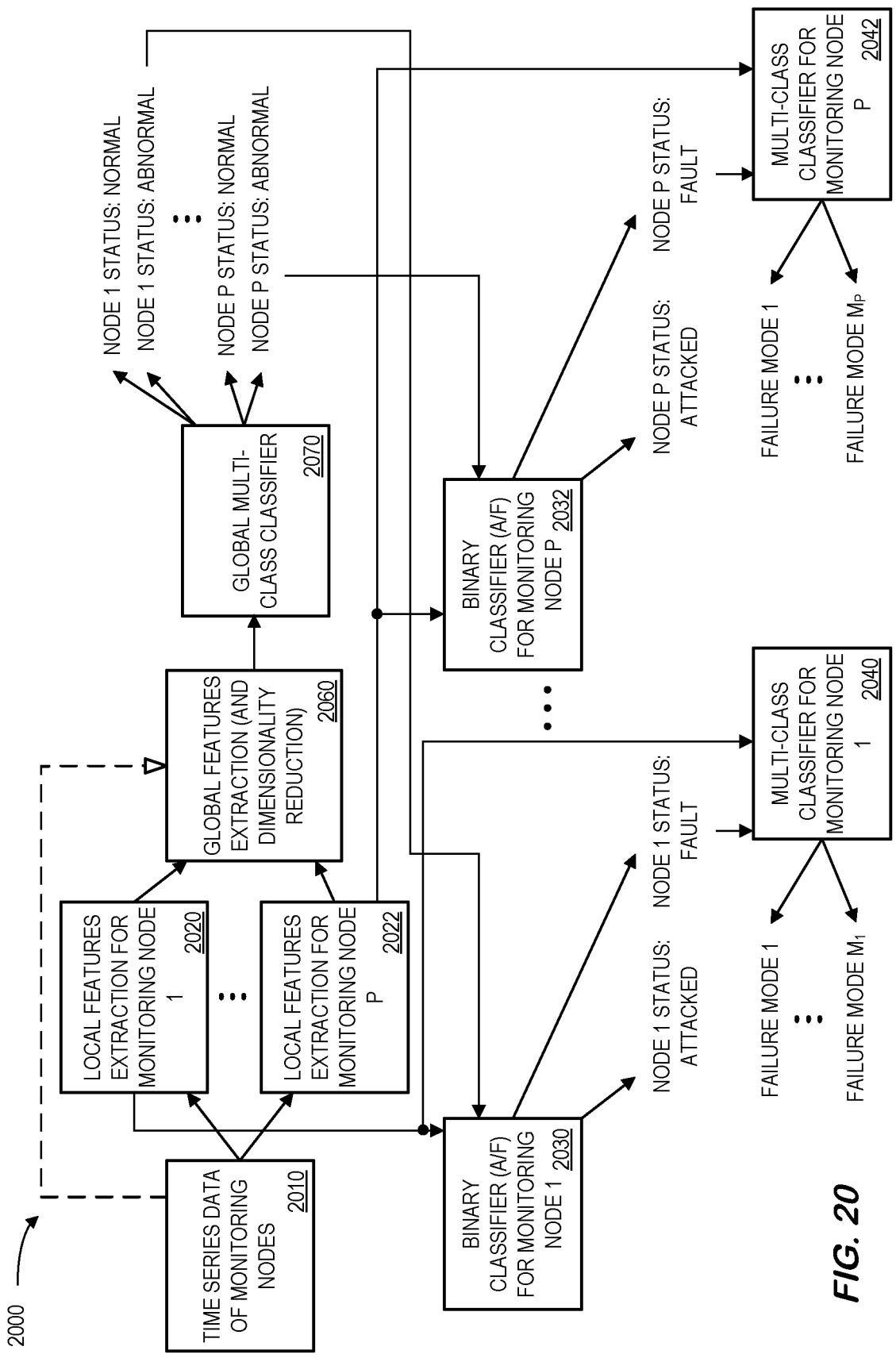

FIG. 20 illustrates an online node classification configuration 2000 in accordance with some embodiments. In this configuration 2000, time series data of monitoring nodes 2010 is used to extract local features for each of P nodes 2020, 2022 as well as to extract global features (at which point dimensionality reduction may be performed) 2060. The global features may be provided to a global multi-class classifier 2070 which indicates whether each individual node is "normal" or "abnormal".

If the global multi-class classifier 2070 indicates that particular node is abnormal (that is, an attack or fault might exist at the node), a binary classifier (A/F) 2030, 2032 may be executed using the local features for each node. The binary class classifier 2030, 2032 will indicate whether a particular node is attacked or fault (based on the global features, the system already knows the node is not "normal"). In the case of fault, a multi-class classifier 2040, 2042 may be executed for each node (using the local features) to determine a particular failure mode (e.g., mode 1 through M). In this configuration 2000, again both local and global features are used. The global feature vector is fed into a large global multi-class classifier 2070 which determines the binary status of all monitoring nodes as being normal or abnormal. This classifier has 2*P classes. At the second layer, the local features of the nodes whose status is abnormal are passed into binary classifiers 2030, 2032 categorizing the abnormalities as attack vs. fault. Finally, if the node status is fault, at the last layer, the failure mode is determined. This is a three-layer decision system with a single global multi-class classifier 2070 (2*P classes) at the first layer, P binary classifiers (attack/fault) at the second layer and P multi-class classifiers (failure modes) at the third layer.

Figure 21:
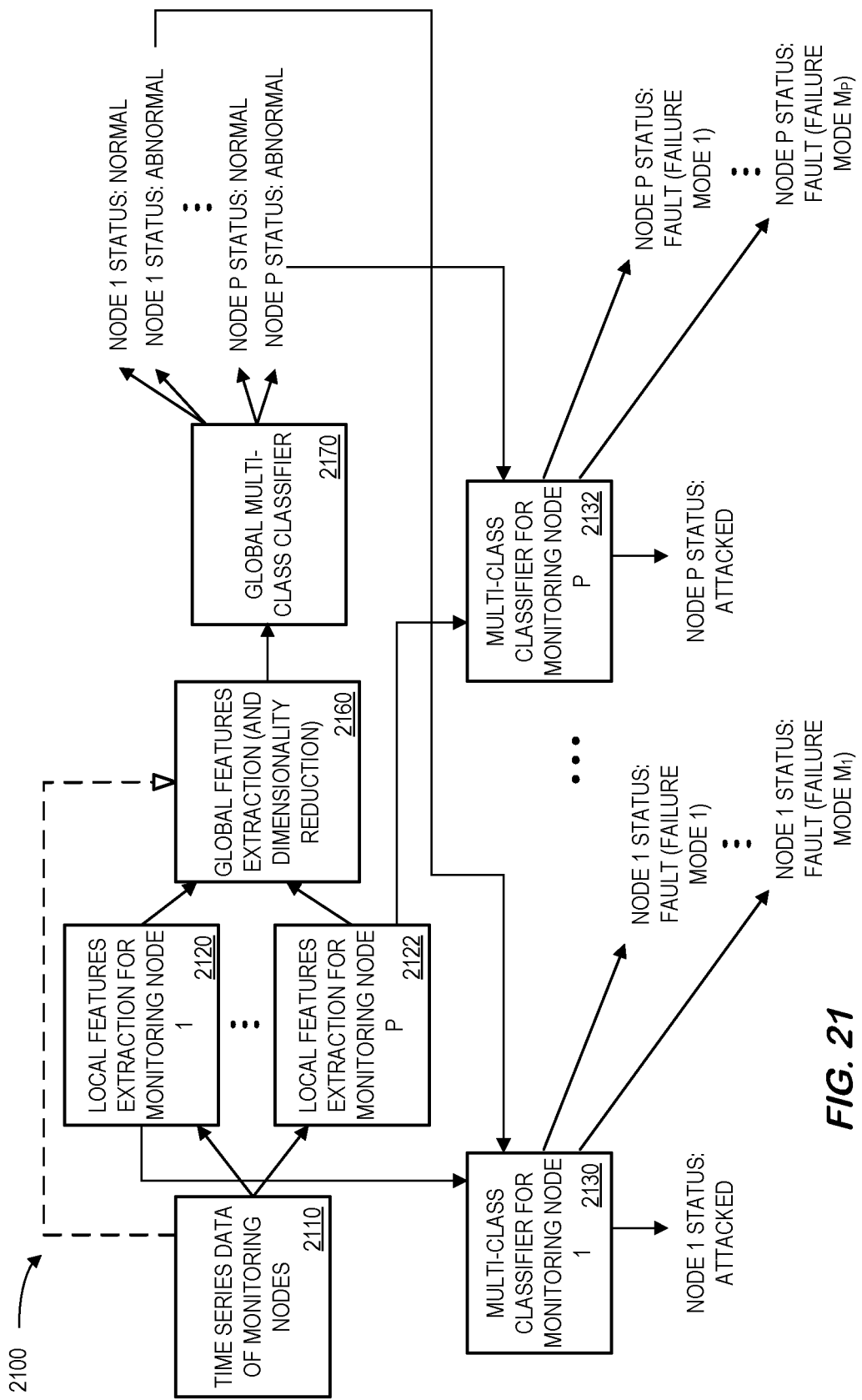

FIG. 21 illustrates an online node classification configuration 2100 in accordance with some embodiments. In this configuration 2100, time series data of monitoring nodes 2110 is used to extract local features for each of P nodes 2120, 2122 as well as to extract global features (at which point dimensionality reduction may be performed) 2160. The global features may be provided to a global multi-class classifier 2170 which indicates whether each individual node is "normal" or "abnormal".

If the global multi-class classifier 2170 indicates that particular node is abnormal (that is, an attack or fault might exist at the node), a multi-class classifier 2130, 2132 may be executed using the local features for each node. The multi-class class classifier 2130, 2132 will indicate whether a particular node is normal, attacked, in a pre-determined number of failure modes (based on the global features, the system already knows the node is not "normal"). This configuration is 2100 similar to configuration 1100 except that here the second and third layers are combined into one layer, making it a two-layer configuration. The first layer has the same global multi-class classifier 2170 as in configuration 1100 and the second layer comprises of P multi-class classifiers each having $M_i+2$ classes as in configuration 1000.

Figure 22:
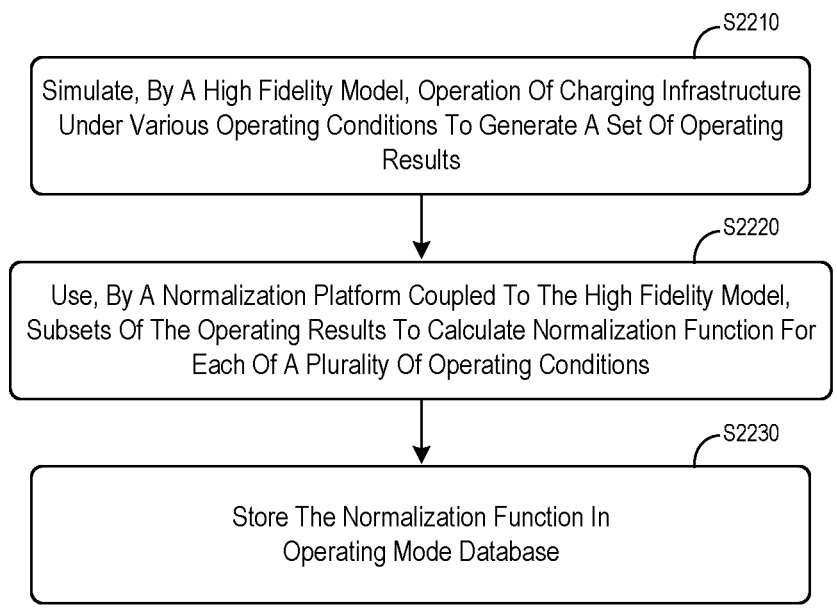
FIG. 22 is an off-line, non-real time, method according to some embodiments.

FIG. 22 is an off-line, non-real time, method according to some embodiments. At S2210, a high-fidelity model may simulate operation of an electric vehicle charging infrastructure under various operating conditions to generate a set of operating results. According to some embodiments, the system may monitor the operation of the electric vehicle charging infrastructure (e.g., instead of simulation operation). At S2220, a normalization platform coupled to the high-fidelity model may use subsets of the operating results to calculate a normalization function (e.g., associated with normalized signals) for each of a plurality of operating conditions. An operating mode database may then be used to store the normalization function and/or normalized signals at S2230.

Figure 23:
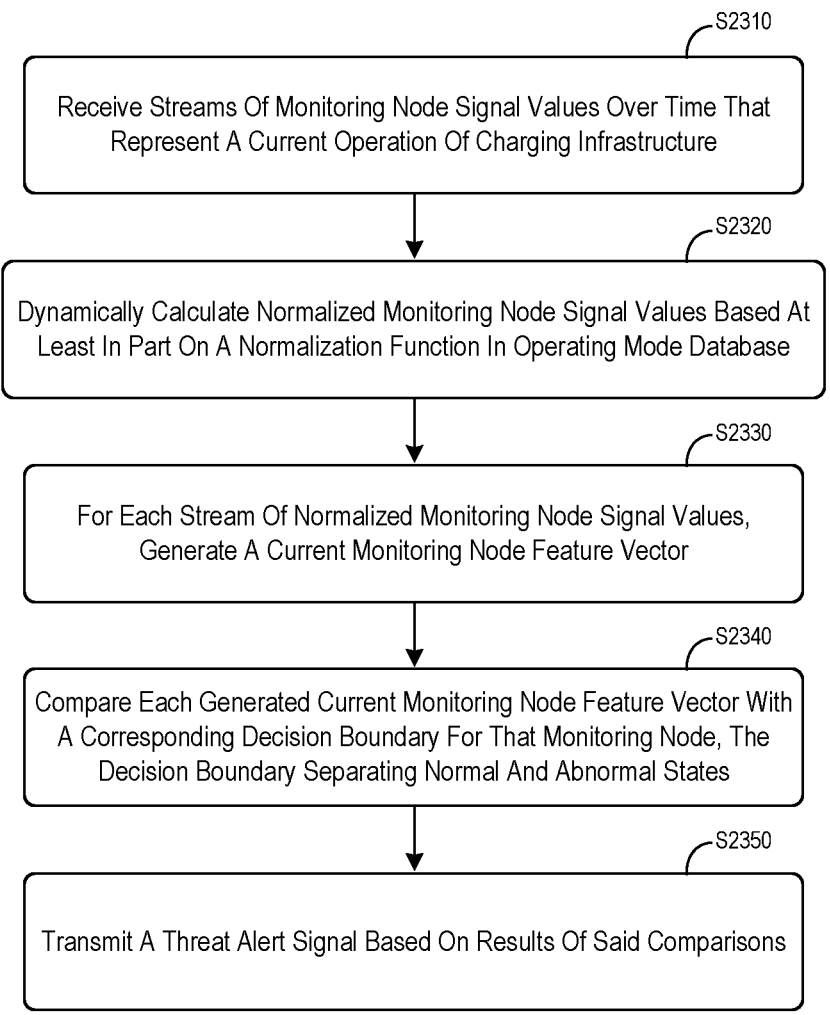
FIG. 23 is a real-time, dynamic method in accordance with some embodiments.

FIG. 23 is a real-time, dynamic method in accordance with some embodiments. At S2310, a plurality of real-time monitoring node signal inputs may receive streams of monitoring node signal values over time that represent a current operation of the electric vehicle charging infrastructure. At S2320, a threat detection computer platform, coupled to the plurality of real-time monitoring node signal inputs and the operating mode database, may receive the streams of monitoring node signal values and dynamically calculate normalized monitoring node signal values based at least in part on a normalization function in the operating mode database. For each stream of normalized monitoring node signal values, the system may generate a current monitoring node feature vector at S2330. Note that the current monitoring node feature vectors may be associated with dynamic temporal normalization and/or dynamic spatial normalization.

At S2340, the system may compare each generated current monitoring node feature vector with a corresponding decision boundary for that monitoring node (the decision boundary separating normal state, attacked state, and fault state for that monitoring node). At 52350, the system may automatically transmit a threat alert signal based on results of said comparisons. The alert signal might be transmitted, for example, via a cloud-based application. According to some embodiments, the alert signal may be transmitted via one or more of a cloud-based system, an edge-based system, a wireless system, a wired system, a secured network, and a communication system.

By way of example only, the electric vehicle charging infrastructure might be associated with operating conditions such as current, power, voltage, etc. Other operating parameters might include an operating mode, an external condition, a system degradation factor, a vehicle type, etc.

Figure 24:
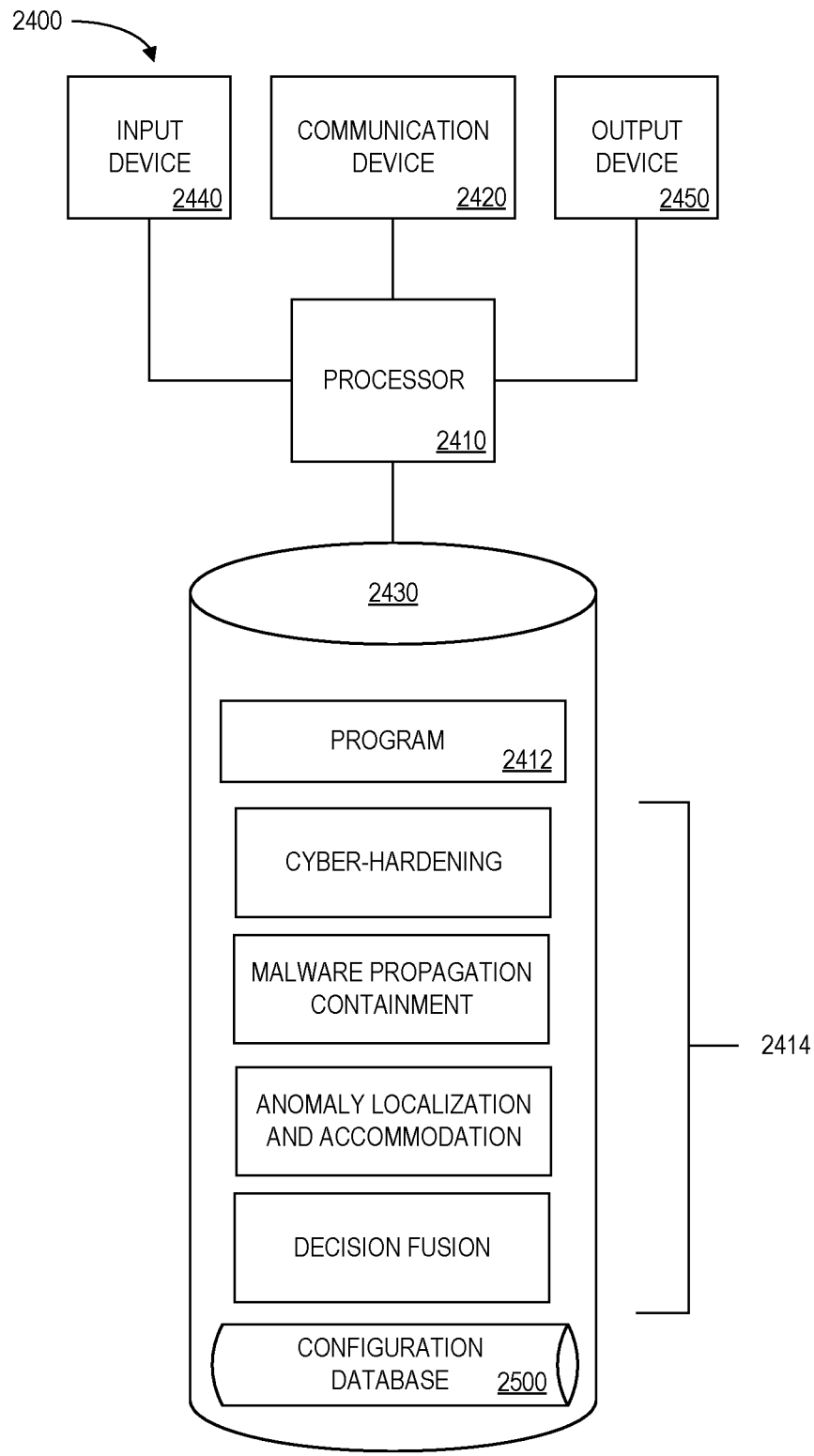
FIG. 24 is a block diagram of an electric vehicle charging infrastructure protection platform according to some embodiments of the present invention.

The embodiments described herein may be implemented using any number of different hardware configurations. For example, FIG. 24 is a block diagram of an electric vehicle charging infrastructure protection platform 2400 that may be, for example, associated with the system 900 of FIG. 9. The electric vehicle charging infrastructure protection platform 2400 comprises a processor 2410, such as one or more commercially available Central Processing Units ("CPUs") in the form of one-chip microprocessors, coupled to a communication device 2460 configured to communicate via a communication network (not shown in FIG. 24). The communication device 2460 may be used to communicate, for example, with one or more remote monitoring nodes, user platforms, digital twins, etc. The electric vehicle charging infrastructure protection platform 2400 further includes an input device 2440 (e.g., a computer mouse and/or keyboard to input adaptive and/or predictive modeling information) and/an output device 2450 (e.g., a computer monitor to render a display, provide alerts, transmit recommendations, and/or create reports). According to some embodiments, a mobile device, monitoring physical system, and/or PC may be used to exchange information with the electric vehicle charging infrastructure protection platform 2400.

The processor 2410 also communicates with a storage device 2430. The storage device 2430 may comprise any appropriate information storage device, including combinations of magnetic storage devices (e.g., a hard disk drive), optical storage devices, mobile telephones, and/or semiconductor memory devices. The storage device 2430 stores a program 2412 and/or modules 2414 (e.g., modules associated with cyber-hardening, malware propagation containment, anomaly localization and accommodation, and/or decision fusion) for controlling the processor 2410. The processor 2410 performs instructions of the programs and modules 2412, 2414, and thereby operates in accordance with any of the embodiments described herein. For example, the processor 2410 may access a normal space data source that stores, for each of a plurality of monitoring nodes, a series of normal monitoring node values that represent normal operation of an electric vehicle charging infrastructure. The processor 2410 may also access attacked and failure space data sources that stores a series of attacked and failure monitoring node values. The processor 2410 may generate sets of normal, attacked, and failure feature vectors and calculate and output a decision boundary for a multi-class classifier model based on the normal, attacked, and failure feature vectors. The plurality of monitoring nodes may then generate a series of current monitoring node values that represent a current operation of the electric vehicle charging infrastructure. The processor 2410 may receive the series of current values, generate a set of current feature vectors, execute the multi-class classifier model, and transmit a classification result based on the current feature vectors and the decision boundary.

The programs 2412, 2414 may be stored in a compressed, uncompiled and/or encrypted format. The programs 2412, 2414 may furthermore include other program elements, such as an operating system, clipboard application, a database management system, and/or device drivers used by the processor 2410 to interface with peripheral devices.

As used herein, information may be "received" by or "transmitted" to, for example: (i) the electric vehicle charging infrastructure protection platform 2400 from another device; or (ii) a software application or module within the electric vehicle charging infrastructure protection platform 2400 from another software application, module, or any other source.

In some embodiments (such as the one shown in FIG. 24), the storage device 2430 further stores a configuration database 2500. An example of a database that may be used in connection with the electric vehicle charging infrastructure protection platform 2400 will now be described in detail with respect to FIG. 25. Note that the database described herein is only one example, and additional and/or different information may be stored therein. Moreover, various databases might be split or combined in accordance with any of the embodiments described herein.

Referring to FIG. 25, a table is shown that represents the configuration database 2500 that may be stored at the electric vehicle charging infrastructure protection platform 2400 according to some embodiments. The table may include, for example, entries identifying electric vehicle charging infrastructure components to be protected. The table may also define fields 2502, 2504, 2506, 2508, 2510, 2512 for each of the entries. The fields 2502, 2504, 2506, 2508, 2510, 2512 may, according to some embodiments, specify: charging station identifier 2502, an electric vehicle charging component description 2504, a global classifier 2506, a local classifier 2508, a fault classifier 2510, and a status 2512. The configuration database 2500 may be created and updated, for example, when a new physical system is monitored or modeled, classifiers are trained, etc.

The charging station identifier 2502 and description 2504 may define a particular machine or system that will be protected. The global classifier 2506, local classifier 2508, and failure classifier 2510 might define, for a particular configuration being implemented for an electric vehicle charging infrastructure, a type of classifier (e.g., none, binary, 3-class, multi-class, etc.) that will be used to monitor for attacks and failures. The status 2512 might indicate whether the appropriate classifier have been trained.

Thus, embodiments may provide technical benefits including comprehensive cybersecurity for IT, OT and physical layers of EVSE equipment, reducing the potential for damage to critical transportation and power delivery infrastructure. Tangible benefits might include savings associated with avoidance of damages to critical power grid infrastructure, due to enhanced grid stability in the face of EVSE cyberattack. Note that that the use of open standards and interoperability of the frameworks described herein may drive widespread adoption, resulting in the safeguarding of a substantially amount EVSE infrastructure and electric vehicle property. Exceptional cyber intrusion detection (e.g., with less than a 2% false positives rate and more than a 98% true positive rate) and anomaly accommodation with up to 30% of nodes attacked may be provided. In addition, post-decision analysis (such as passing alertness to on operator with specific fault/diagnostic information) may be facilitated and an appropriate fault-tolerant control or attack neutralization action might be automatically invoked. Further, embodiments may enable automatic detection and classification into attacks and different types of faults or system anomalies, provide an additional cyber layer of defense, and increase confidence that a rapid response to system faults can be achieved. Note that any of the configurations described herein might be implemented as an application and deployed to electric vehicle charging infrastructure sites, be controlled with a license key, and/or could be incorporated as an electric vehicle charging infrastructure monitoring service.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Embodiments might be tested, for example, using data sets collected from simulation of a high-fidelity physics-based model of a charging station. For example, 20 monitoring nodes might be selected to create a collection of sensor, actuator and controller nodes. The generated data set might include a number of normal time series per node, consisting of different load levels and ambient conditions, a number of attack time series per node, designed using DoE (over multiple attack factors), and a number of fault time series per node simulated over different load levels and ambient conditions. The fault scenario might be, for example, based on a simulation of a single failure mode (a hard failure) of each node. In the simulation, a number of statistical features might be extracted for each monitoring node and classifiers might be trained using kernel ELM with a nonlinear kernel, namely Radial Basis Function ("RBF"). The number of neurons in the output layer of ELM may be automatically selected as well as the number of classes.

FIG. 26 is classification results according to some embodiments. Each classifier has three classes, normal (N), attack (A), and fault (F). The tables 2610, 2620 show the number and percentage of each actual class in the data vs. those predicted by the classifiers. In each table, the numbers of the main diagonal represent correct classifications while the numbers on the off-diagonals represent misclassifications. As seen in the tables, for both nodes, there may be a complete separation between the fault class vs. normal and attack classes. In this example, the correct classification for attacks was 98.25%, with 1.64% misclassification into normal and 0.11% misclassification into fault. The correct classification for normal cases is 95.65%, with 4.35% misclassification into attack and without any misclassification into fault.

Figure 27:
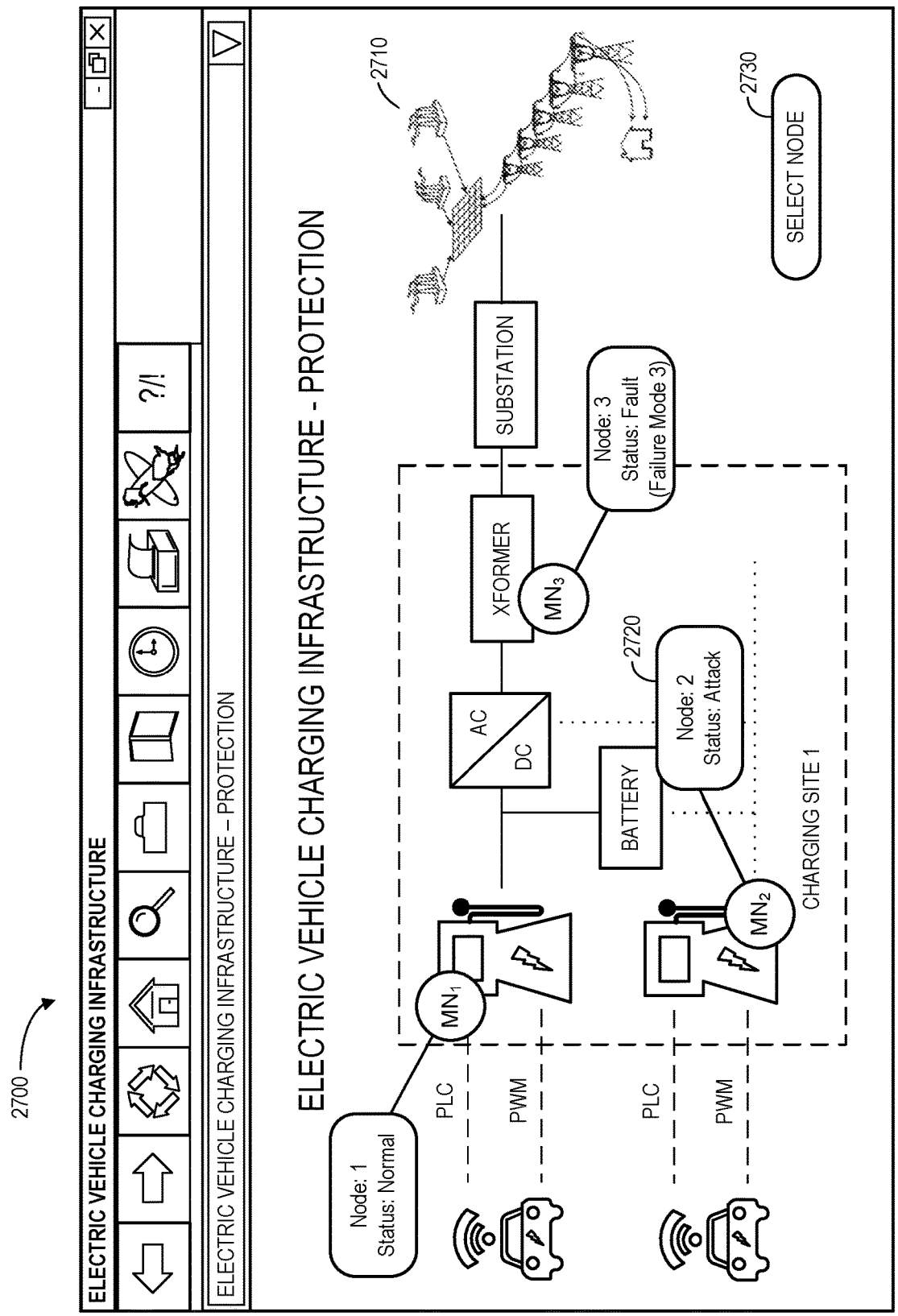
FIG. 27 is a multi-class decision system display in accordance with some embodiments.

FIG. 27 is a multi-class decision system display 2700 in accordance with some embodiments. The display 2700 includes a graphical representation of an electric vehicle charging infrastructure 2710 having a number of monitoring nodes ($MN_1$ through $MN_2$). In particular, the display 2700 includes, for each node, an indication of a current status 2720 as determined by any of the embodiments described herein. According to some embodiments, the display 2700 is interactive and may be used by an operator to determine more detailed information (e.g., via selection of an icon 2730 via a touchscreen or computer mouse pointer) and/or to adjust the operation of the system.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an electric vehicle charging infrastructure, comprising:
   an electric vehicle charging site to receive alternating current power from a power grid and provide direct current power to electric vehicles, including:
   a plurality of monitoring nodes each generating a series of current monitoring node values over time that represent a current operation of the electric vehicle charging infrastructure,
   a supply equipment communication controller to receive an access request from an access requestor associated with an electric vehicle, the access request being associated with a platform certificate and a software identifier, wherein the platform certificate provides a hardware identity associated with an electric vehicle communication controller, a secondary actor policy decision point server to:

evaluate the access requestor's identity based on the platform certificate and respond with an action message allowing high-level communication with the access requestor to proceed, wherein an output of the evaluation is stored in a secure, distributed transaction ledger, and receive a classification result of normal, attacked or fault for each node in the series of monitoring node values based on a decision boundary for a multi-class classifier model calculated with a set of normal feature vectors, a set of attacked feature vectors and a set of fault feature vectors;

fuse the output of the evaluation and the classification to a final decision, including allowing or refusing an electrical or communication connection;

wherein the final decision and information associated with at least one of the current monitoring node values and the access request is stored in the secure, distributed transaction ledger.

2. The system of claim 1, wherein the secure, distributed transaction ledger is associated with an attestation blockchain.

3. The system of claim 1, wherein the current monitoring node values are associated with at least one of: (i) voltage, (ii) current, (iii) a charging rate limit, (iv) a duty ratio, (v) a transformer temperature, (vi) a load, (vii) a visit date, (viii) a driver preference, (ix) a radio frequency identifier tag, (x) a demand response command, (xi) weather data, (xii) pricing data, and (xiii) a firewall log file.

4. The system of claim 1, wherein the access request is further associated with at least one of: (i) a trusted platform module, (ii) a hardware root of trust, (iii) platform configuration registers, (iv) a trusted connection network, (v) a policy enforcement point, and (vi) an electric vehicle power standard.

5. The system of claim 1, wherein bi-directional authentication of the electric vehicle and the electric vehicle charging site is performed.

6. The system of claim 1, wherein the electric vehicle charging site is associated with extreme fast charging.

7. The system of claim 1, further comprising:

a node classifier computer, coupled to the plurality of monitoring nodes, to:

(i) receive the series of current monitoring node values and generate a set of current feature vectors, (ii) access at least one multi-class classifier model having at least one decision boundary, and (iii) execute the at least one multi-class classifier model and transmit the classification result based on the set of current feature vectors and the at least one decision boundary.

8. The system of claim 7, wherein decision fusion resides in the secondary actor policy decision point.

9. The system of claim 7, wherein decision fusion resides in a Charging Station Energy Management System ("EMS-Si").

10. The system of claim 9, wherein the output of the secondary actor policy decision point is transmitted to the EMS-Si, and the classification result and a detection feature or decision from malware propagation containment module, stability monitoring and assurance module, and the output of a platform identity evaluation in the secondary actor policy decision point are fused to a final decision, including allowing or refusing an electrical or communication connection.

11. The system of claim 7, wherein decision fusion resides in a Centralized Distribution Substation Energy Management System ("EMS-DS") or a Centralized Multiple Charging Stations Energy Management System ("EMS-CO").

12. The system of claim 11, wherein the output of the secondary actor policy decision point is transmitted to a Charging Station Energy Management System ("EMS-Si"), and the classification result and the detection feature or decision from malware propagation containment module, stability monitoring and assurance module, and the output of platform identity evaluation in the secondary actor policy decision point are fused to a final decision, including allowing or refusing an electrical or communication connection.

13. The system of claim 7, wherein decision fusion resides in in both a Centralized Distribution Substation Energy Management System ("EMS-DS") and a Charging Station Energy Management System ("EMS-Si").

14. The system of claim 13, wherein the EMS-Si aggregates information within the charging site to make a cyber protection decision; and the EMS-DS aggregates both the decision output and the device information from each EMS-Si to address a covert attack and coordinated attacks on multiple stations.

15. The system of claim 7, wherein decision fusion is within at least one of: (i) a raw data level, (ii) a feature level, and (iii) a decision level.

16. The system of claim 7, wherein at least one monitoring node is associated with at least one of: (i) a sensor node, (ii) a critical sensor node, (iii) an actuator node, (iv) a controller node, and (v) a key software node.

17. The system of claim 7, wherein the classification result further includes, in the case of a monitoring node status indicating a fault, a failure mode.

18. The system of claim 7, wherein the set of current feature vectors includes at least one of: (i) a local feature vector associated with a particular monitoring node, and (ii) a global feature vector associated with a plurality of monitoring nodes.

19. The system of claim 7, wherein the set of current feature vectors are associated with at least one of: (i) principal components, (ii) statistical features, (iii) deep learning features, (iv) frequency domain features, (v) time series analysis features, (vi) logical features, (vii) geographic or position based locations, and (viii) interaction features.

20. The system of claim 7, wherein the multi-class classifier model is associated with at least one of: (i) an actuator attack, (ii) a controller attack, (iii) a monitoring node attack, (iv) a plant state attack, (v) spoofing, (vi) financial damage, (vii) unit availability, (viii) a unit trip, (ix) a loss of unit life, and (x) asset damage requiring at least one new part.

21. The system of claim 7, wherein information from each of the plurality of monitoring nodes is normalized and an output is expressed as a weighted linear combination of basis functions.

22. The system of claim 7, wherein the at least one decision boundary is associated with at least one of: (i) a line, (ii) a hyperplane, and (iii) a non-linear boundary.

23. The system of claim 7, wherein said executing includes:

determining, by a global binary classifier, whether the electric vehicle charging infrastructure is normal or abnormal;

when the electric vehicle charging infrastructure is abnormal, determining, by a 3-class classifier for each monitoring node, whether the node is normal, attacked, or faulty; and when a node is faulty, determining, by a multi-class classifier for each monitoring node, a failure mode for the monitoring node.

24. The system of claim 7, wherein said executing includes determining, by a global binary classifier, whether the electric vehicle charging infrastructure is normal or abnormal; and when the electric vehicle charging infrastructure is abnormal, determining, by a multi-class classifier for each monitoring node, whether the node is normal, attacked, or one of a pre-determined number of failure modes.

25. The system of claim 7, wherein said executing includes determining, by a 3-class classifier for each monitoring node, whether the node is normal, attacked, or faulty; and when a node is faulty, determining, by a multi-class classifier for each monitoring node, a failure mode for the monitoring node.

26. The system of claim 7, wherein said executing includes determining, by a multi-class classifier for each monitoring node, whether the node is normal, attacked, or faulty, or one of a pre-determined number of failure modes.

27. The system of claim 7, wherein said executing includes determining, by global multi-class classifier, whether each monitoring node is normal or abnormal;

when a monitoring node is abnormal, determining, by a binary classifier for each monitoring node, whether the node is attacked or faulty; and when a node is faulty, determining, by a multi-class classifier for each monitoring node, a failure mode for the monitoring node.

28. The system of claim 7, further comprising:

a normal space data source storing, for each of the plurality of monitoring nodes, a series of normal monitoring node values over time that represent normal operation of the electric vehicle charging infrastructure;

an attacked space data source storing, for each of the plurality of monitoring nodes, a series of attacked monitoring node values over time that represent attacked operation of the electric vehicle charging infrastructure;

a faulty space data source storing, for each of the plurality of monitoring nodes, a series of faulty monitoring node values over time that represent faulty operation of the electric vehicle charging infrastructure; and a multi-class classifier model creation computer, coupled to the normal space data source, the attacked space data source, and the fault space data source, to:
  (i) receive the series of normal monitoring node values and generate a set of normal feature vectors,
  (ii) receive the series of attacked monitoring node values and generate a set of attacked feature vectors,
  (iii) receive the series of faulty monitoring node values and generate a set of faulty feature vectors, and
  (iv) automatically calculate and output the at least one decision boundary for the multi-class classifier model based on the set of normal feature vectors, the set of attacked feature vectors, and the set of faulty feature vectors.

29. The system of claim 28, wherein at least one of the series of normal monitoring node values, the series of attacked monitoring node values, and the series of faulty monitoring node values are associated with a high-fidelity equipment model.

30. The system of claim 28, wherein at least one decision boundary exists in a multi-dimensional space and is associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

31. The system of claim 28, wherein at least one of the normal, attacked, and faulty monitoring node values are obtained by running design of experiments on the electric vehicle charging infrastructure.

* * * * *